(12) United States Patent
Kurokawa

(10) Patent No.: US 8,058,997 B2
(45) Date of Patent: Nov. 15, 2011

(54) WIRELESS SYSTEM, SEMICONDUCTOR DEVICE, AND COMMUNICATION DEVICE

(75) Inventor: Yoshiyuki Kurokawa, Sagamihara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 471 days.

(21) Appl. No.: 12/010,790

(22) Filed: Jan. 30, 2008

(65) Prior Publication Data
US 2008/0186182 A1 Aug. 7, 2008

(30) Foreign Application Priority Data
Feb. 2, 2007 (JP) ................. 2007-024143

(51) Int. Cl.
*G08B 13/14* (2006.01)
(52) U.S. Cl. .................... 340/572.4; 340/508
(58) Field of Classification Search ........... 340/572.1, 340/572.4, 10.1, 508; 714/699, 746, 797, 714/799, 819, 820
See application file for complete search history.

(56) References Cited

U.S. PATENT DOCUMENTS

| | | | |
|---|---|---|---|
| 4,209,783 A * | 6/1980 | Ohyama et al. ............ | 340/10.42 |
| 4,751,478 A | 6/1988 | Yoshida | |
| 5,661,470 A * | 8/1997 | Karr ............................ | 340/10.33 |
| 6,381,251 B1 | 4/2002 | Sano et al. | |
| 6,865,699 B2 | 3/2005 | Tanaka et al. | |
| 7,209,040 B2 | 4/2007 | Barink et al. | |
| 7,366,465 B2 * | 4/2008 | Barink et al. .............. | 340/572.1 |
| 7,457,442 B2 | 11/2008 | Mimura et al. | |
| 7,783,581 B2 | 8/2010 | Hosoi et al. | |
| 2004/0078101 A1 | 4/2004 | Kondoh et al. | |
| 2004/0164302 A1 | 8/2004 | Arai et al. | |
| 2005/0130389 A1 | 6/2005 | Yamazaki et al. | |
| 2006/0236168 A1 | 10/2006 | Wolfe et al. | |
| 2007/0030143 A1 | 2/2007 | Benson et al. | |
| 2007/0063920 A1 | 3/2007 | Shionoiri et al. | |
| 2007/0252208 A1 | 11/2007 | Koyama et al. | |
| 2008/0122297 A1 | 5/2008 | Arai | |
| 2008/0186181 A1 | 8/2008 | Kurokawa | |

FOREIGN PATENT DOCUMENTS

| | | |
|---|---|---|
| JP | 2000-149194 | 5/2000 |
| JP | 2003-067683 A | 3/2003 |
| JP | 2006-303912 A | 11/2006 |
| WO | WO-2006/107612 | 10/2006 |

OTHER PUBLICATIONS

"Sense of Crisis" is a Trigger. Ignited Evolution of a Sesame-Grain Sized Chip, Technology Development is Entering into the Second Phase, Nikkei Electronics, Nov. 18, 2002, No. 835, pp. 67-76.
"European Search Report (Application No. 08001424.4; EP10337) Dated Dec. 15, 2010,".
Chinese Office Action (Application No. 200810005777.1) Dated May 17, 2011.

* cited by examiner

*Primary Examiner* — Thomas Mullen
(74) *Attorney, Agent, or Firm* — Eric J. Robinson; Robinson Intellectual Property Law Office, P.C.

(57) ABSTRACT

A wireless system includes a semiconductor device including a plurality of functional circuits each having the same function, and a communication device. The semiconductor device modulates and transmits a processing result of each functional circuit using subcarriers each having different frequencies. The communication device extracts a normal response by majority decision from a processing result of each functional circuit received. In this manner, a wireless system with high durability can be provided at low cost.

27 Claims, 15 Drawing Sheets

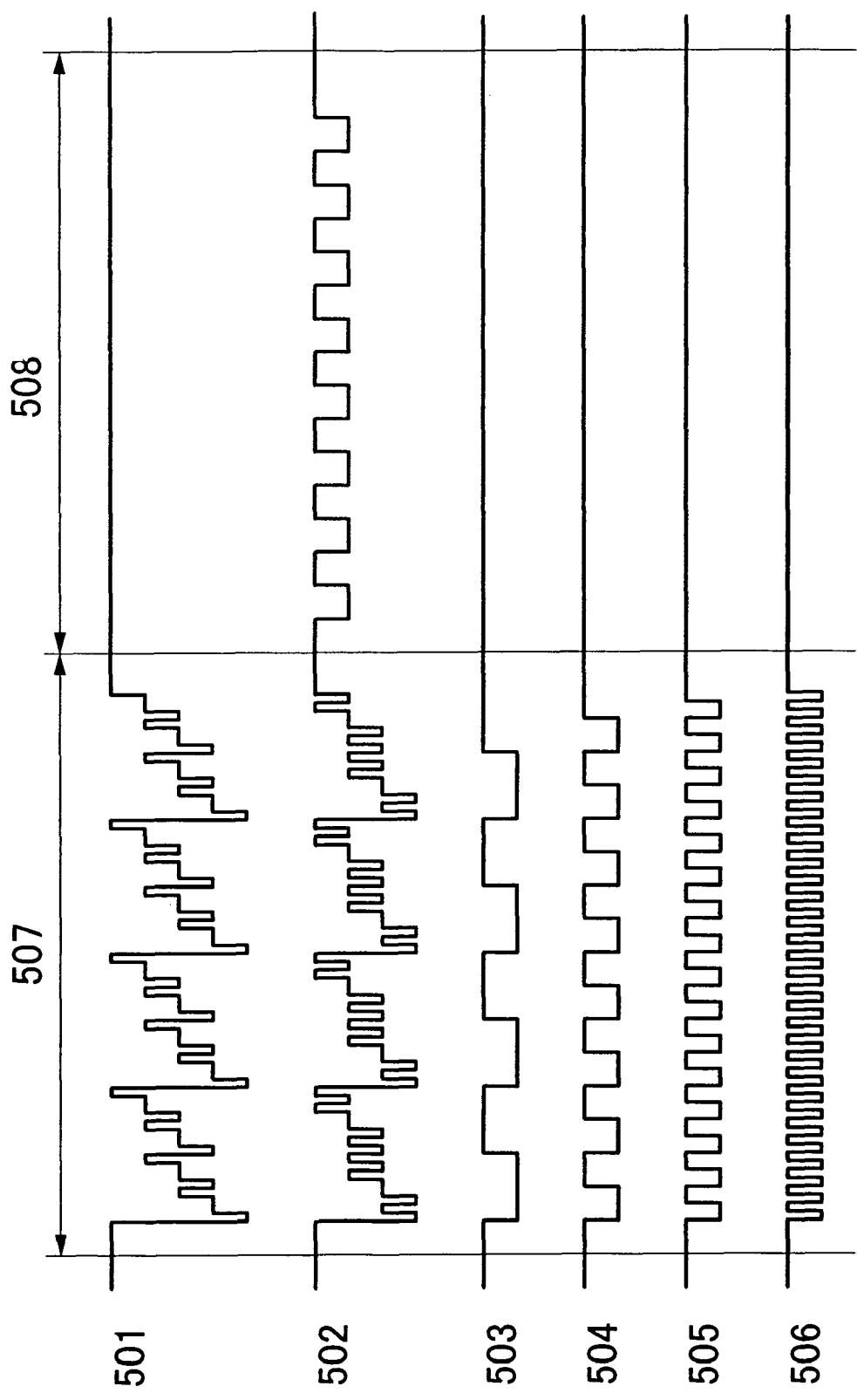

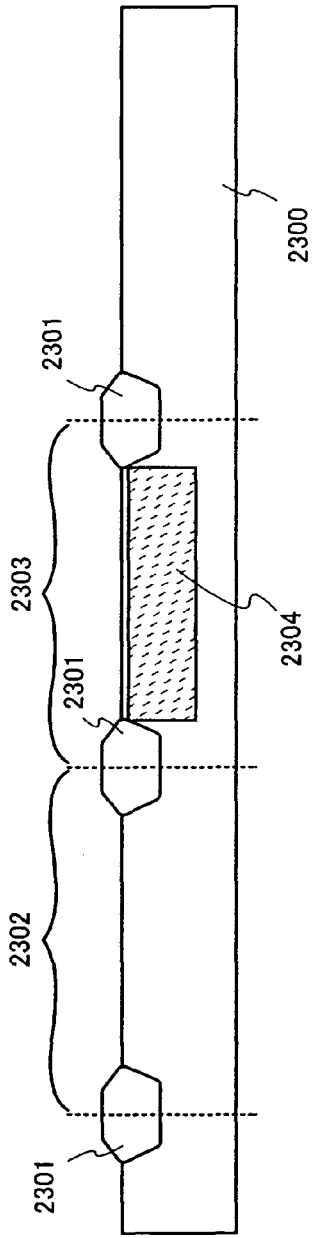
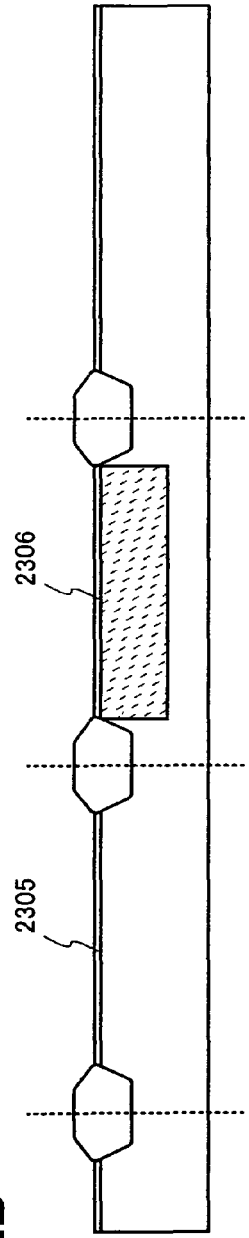
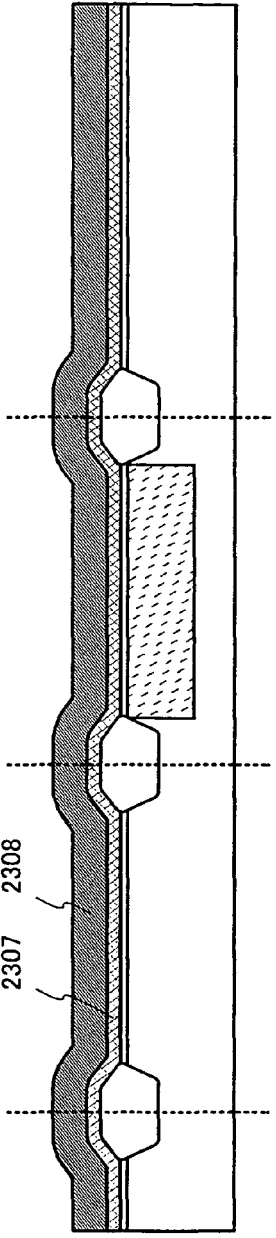
FIG. 12A
FIG. 12B
FIG. 12C

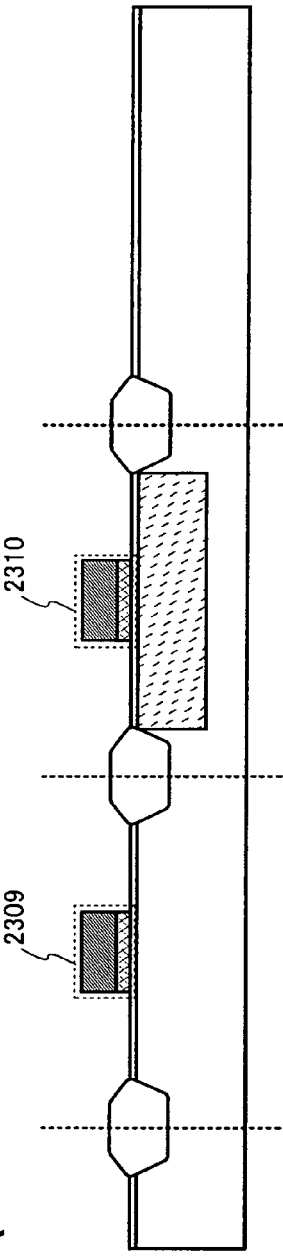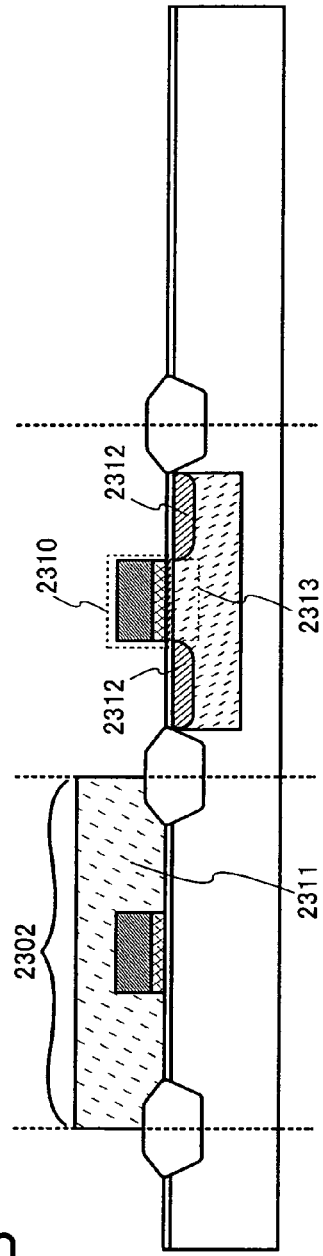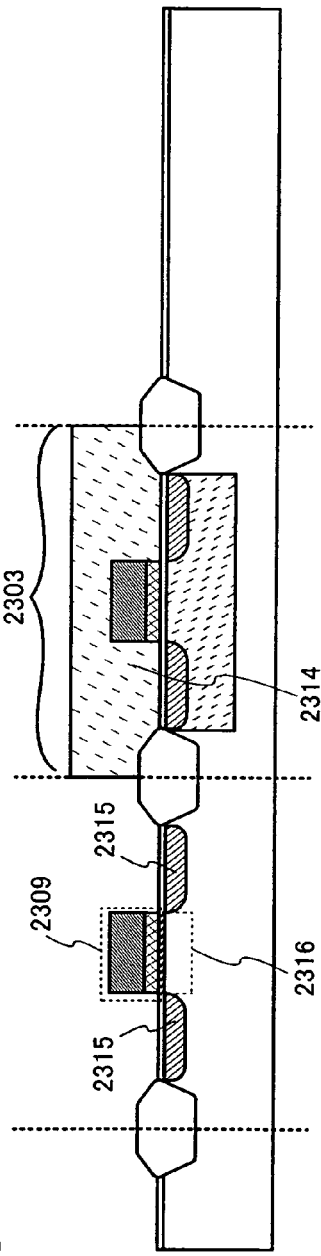

FIG. 15A
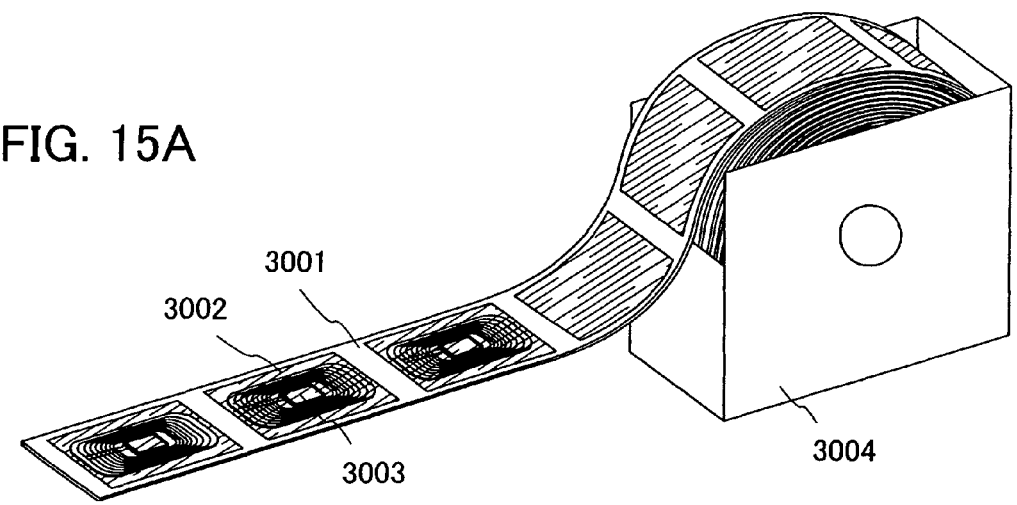
FIG. 15B
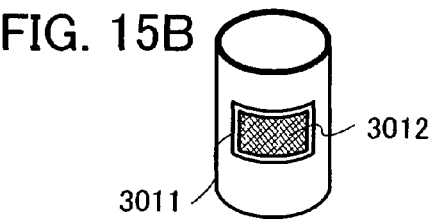
FIG. 15C
FIG. 15D
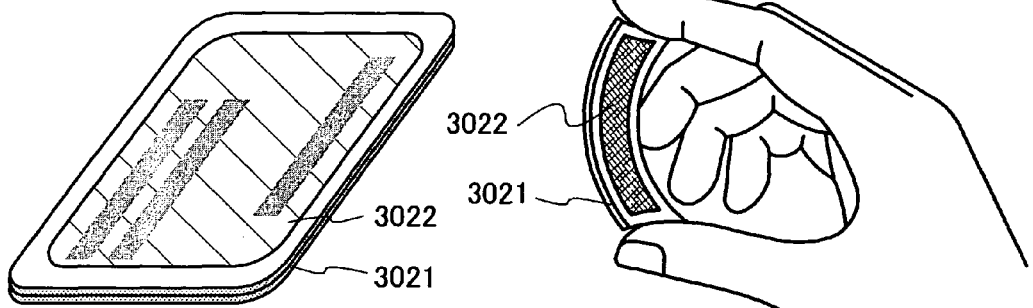
FIG. 15E
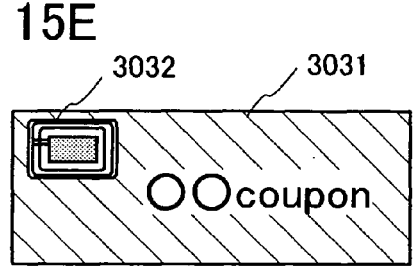

WIRELESS SYSTEM, SEMICONDUCTOR DEVICE, AND COMMUNICATION DEVICE

BACKGROUND OF THE INVENTION

1. Field of the Invention

The present invention relates to a semiconductor device which transmits and receives data using radio signals. In addition, the present invention relates to an external communication device which transmits and receives radio signals to/from a semiconductor device. In addition, the present invention relates to a wireless system having a semiconductor device and a communication device.

2. Description of the Related Art

In recent years, a small semiconductor device in which a small IC chip and an antenna for wireless communication are combined (hereinafter referred to as a semiconductor device; and also called an RFID tag, a wireless tag, an ID tag, an RF tag, or a wireless chip) has attracted attention. The semiconductor device can perform noncontact transmission and reception of data, such as writing and reading data, by transmitting or receiving communication signals to/from an external communication device (hereinafter referred to as a communication device; and also called a reader/writer, a controller, or an interrogator).

As an application field of a semiconductor device which transmits and receives data through radio signals, for example, merchandise management in the distribution industry is given. These days merchandise management with a barcode or the like is widespread; however, data cannot be read when there is an interrupting object because data stored in the barcode is optically read. On the other hand, in data transmission and reception without contact through a wireless communication device, since data in a semiconductor device is read wirelessly, it can be read even if there is an interrupting object. Therefore, a promotion of efficiency and a cost reduction in merchandise management are expected. In addition, the semiconductor device is expected to have a broad range of applications such as railway tickets, air tickets, and automatic payment systems (Reference 1: Japanese Published Patent Application No. 2000-149194). A system in which people or objects are distinguished by using a small semiconductor device which transmits and receives data wirelessly is called RFID (radio frequency identification) and it has attracted attention as a fundamental technology in IT society.

SUMMARY OF THE INVENTION

A semiconductor device is sometimes used in a bad environment such as high temperature, low temperature, and high humidity, and is also used being attached to a spot to which mechanical stress is added. Therefore, in order to improve reliability of a system using the semiconductor device, high durability is required for the semiconductor device. However, since inexpensive price is also required for the semiconductor, a costly process cannot be used to improve reliability.

In view of the foregoing problems, an object of the present invention is to provide a wireless system, a semiconductor device, and a communication device with high reliability at low cost. In addition, another object of the present invention is to provide a wireless system with high reliability including a plurality of semiconductor devices, and a communication device at low cost.

A wireless system of the present invention includes a semiconductor device having a plurality of functional circuits each having the same function, and a communication device. The semiconductor device modulates and transmits a processing result of each functional circuit by using subcarriers each having a different frequency, and the communication device extracts a normal response by majority decision from the processing result of each functional circuit received. Another wireless system of the present invention includes a plurality of semiconductor devices and a communication device. The semiconductor devices modulate and transmit each processing result by using subcarriers each having a different frequency, and the communication device extracts a normal response by majority decision from the processing result of each semiconductor device received. Hereinafter, a specific structure of the wireless system of the present invention will be described.

A wireless system according to one aspect of the present invention includes a semiconductor device which has a plurality of functional circuits, and transmits processing signals of the plurality of functional circuits, and a communication device which has an arithmetic processing circuit and receives the processing signals. The processing signals are signals transmitted using subcarriers whose frequencies differ in each of the plurality of functional circuits. The arithmetic processing circuit in the communication device is a circuit which performs a majority decision process to the processing signals.

A wireless system according to one aspect of the present invention includes a plurality of semiconductor devices, each of which has a functional circuit, and transmits a processing signal of the functional circuit, and a communication device which has an arithmetic processing circuit and receives the processing signal. The processing signal is a signal transmitted using a subcarrier whose frequency differs in each functional circuit in the plurality of semiconductor devices. The arithmetic processing circuit in the communication device is a circuit which performs a majority decision process to the processing signal.

A semiconductor device according to one aspect of the present invention includes a plurality of functional circuits, a controller which reads data stored in each of the plurality of functional circuits, and a transmission/reception circuit which transmits the data as a processing signal superimposed with subcarriers whose frequencies differ in each of the plurality of functional circuits to a communication system, and which receives a signal of processed data output according to majority decision processed data obtained by a majority decision process in an arithmetic processing circuit in the communication device.

A communication device according to one aspect of the present invention includes a transmission/reception circuit which receives a processing signal from a semiconductor device having a plurality of functional circuits in which the processing signal is superimposed with subcarriers whose frequencies differ in each of the plurality of functional circuits, and which transmits processed data to the semiconductor device, and includes an arithmetic processing circuit for majority decision processing of the processing signal received at the transmission/reception circuit, and for outputting majority decision processed data.

A communication device according to one aspect of the present invention includes a transmission/reception circuit which receives a processing signal from a plurality of semiconductor devices each having a functional circuit in which the processing signal is superimposed with subcarriers whose frequencies differ in each of the plurality of functional circuits, and which transmits processed data to the semiconductor device, and includes an arithmetic processing circuit for majority decision processing of the processing signal received at the transmission/reception circuit, and for outputting majority decision processed data.

By employing the present invention, a wireless system, a semiconductor device, and a communication device with high reliability can be provided even if part of functional circuits in the semiconductor device is damaged mechanically or electrically, and cannot give a normal processing result, a normal processing result can be obtained from other functional circuits. In addition, a wireless system and a communication device with high reliability can be provided even if one semiconductor device is damaged mechanically or electrically, and cannot give a normal processing result, a normal processing result can be obtained from other semiconductor devices.

BRIEF DESCRIPTION OF THE DRAWINGS

FIG. 5 illustrates waveforms of communication signals between a semiconductor device and a communication device in a wireless system of the present invention.

FIGS. 12A to 12C are cross-sectional views of a semiconductor device in the present invention.

FIGS. 13A to 13C are cross-sectional views of a semiconductor device in the present invention.

FIGS. 15A to 15E are diagrams illustrating an IC label and an IC card including a semiconductor device in the present invention.

DETAILED DESCRIPTION OF THE INVENTION

Figure 1:
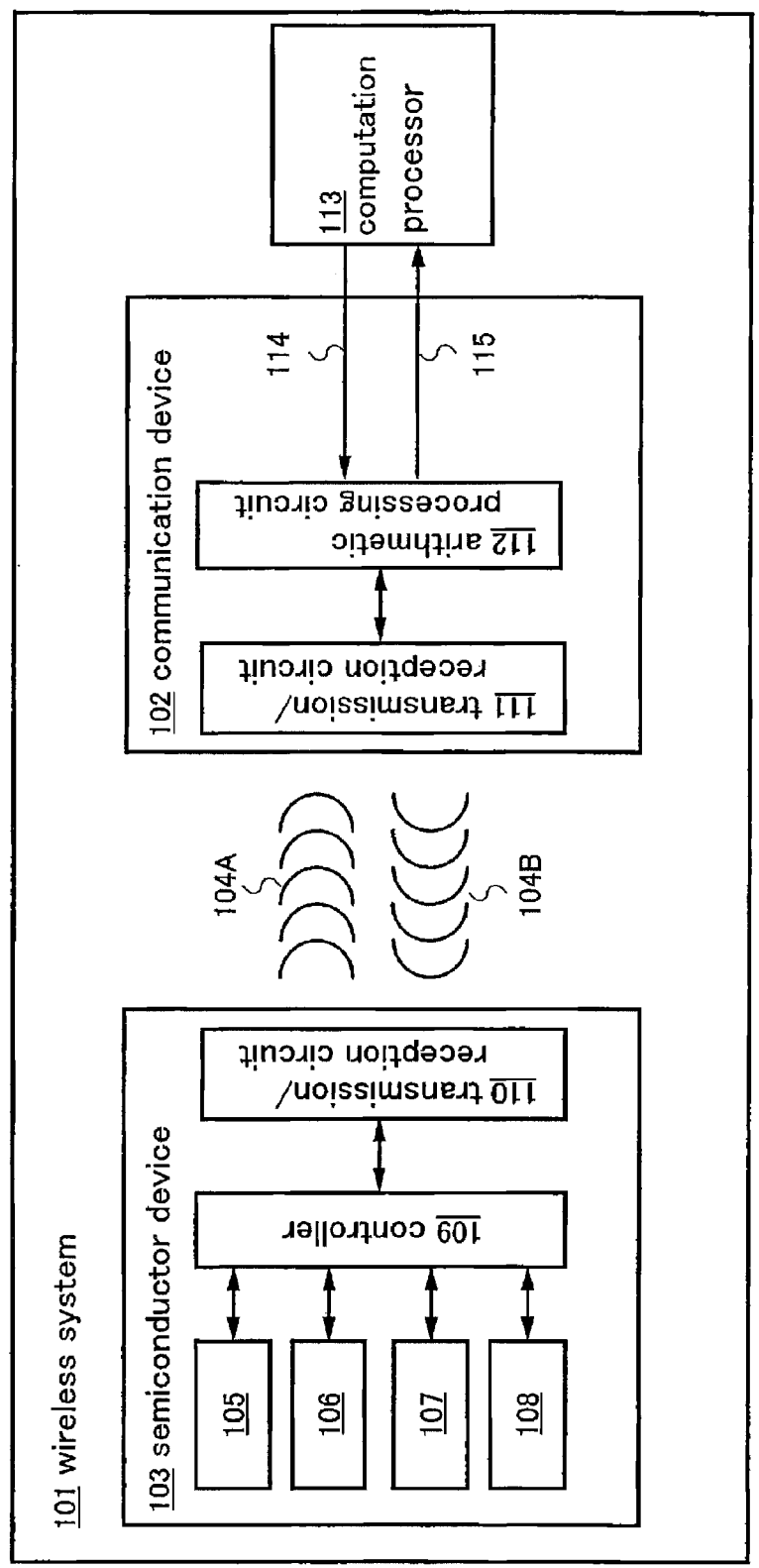
FIG. 1 is a block diagram of a wireless system in the present invention.

Hereinafter, embodiment of the present invention will be described with reference to the accompanying drawings. However, it is to be understood by those skilled in the art that the present invention can be implemented in various modes, and the modes and the details thereof can be variously changed unless such changes depart from the spirit and scope of the invention. Therefore, the present invention should not be construed as being limited to the descriptions of the embodiments below. Note that in all the drawings for describing the embodiments, portions that are the same or portions having similar functions are denoted by the same reference numerals, and repeated description is omitted.

Embodiment 1

Figure 2:
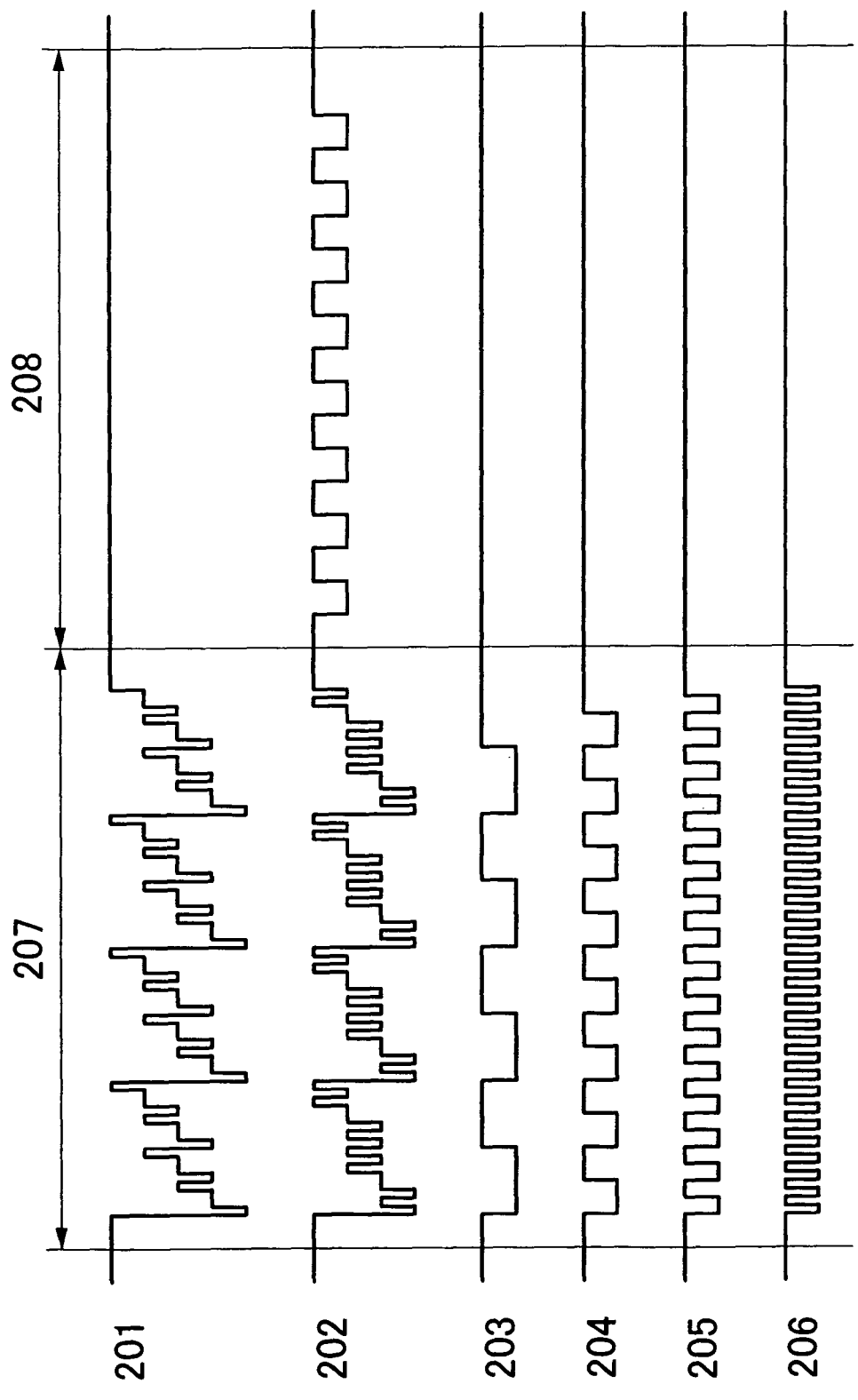
FIG. 2 illustrates waveforms of communication signals between a semiconductor device and a communication device in a wireless system of the present invention.

In this embodiment, an exemplary structure of a wireless system in the present invention will be described with reference to FIGS. 1 to 3D. FIG. 1 is a block diagram of the wireless system in the present invention in this embodiment. FIG. 2 illustrates radio signals of the wireless system in the present invention in this embodiment. FIGS. 3A to 3D illustrate waveforms of radio signals of the wireless system, which are subjected to Fourier transform, in the present invention in this embodiment.

In FIG. 1, a wireless system 101 includes a communication device 102 and a semiconductor device 103. The communication device 102 and the semiconductor device 103 transmit and receive information through a first radio signal 104A and a second radio signal 104B. Note that the first radio signal 104A is a signal from the semiconductor device 103 to the communication device 102, and the second radio signal 104B is from the communication device 102 to the semiconductor device 103. The semiconductor device 103 has a first functional circuit 105, a second functional circuit 106, a third functional circuit 107, and a fourth functional circuit 108, each of which has the same function; a controller 109; and a transmission/reception circuit 110. The communication device 102 has a transmission/reception circuit 111, and an arithmetic processing circuit 112. Note that in this embodiment, the wireless system 101 with the semiconductor device 103 which is equipped with four functional circuits will be described. However, a description below can be easily extended to the wireless system 101 with the semiconductor device 103 which is equipped with n (n is a natural number equal to or more than 3) functional circuits.

In a computation processor 113, application software of the wireless system is operating. In addition, the computation processor 113 is designed in accordance with arithmetic capacity required for execution of the application software. Note that the computation processor 113 has functions of outputting processed data 114 to the arithmetic processing circuit 112 in accordance with a content of execution of the application software and receiving majority decision processed data 115 from the arithmetic processing circuit 112. Here, the processed data 114 includes a command to be executed in the semiconductor device 103, data required for execution of the command, and the like.

In the communication device 102, the transmission/reception circuit 111 has a function of regenerating first to fourth processing data from the first radio signal 104A transmitted from the semiconductor device 103. Specifically, the transmission/reception circuit 111 is equipped with a demodulation circuit which has a function of extracting serial data in time sequence, "H" or "L", in accordance with signal strength which corresponds to each different frequency of first to fourth subcarriers by changing the amplitude of the first radio signal 104A by Fourier transform.

In addition, the transmission/reception circuit 111 has functions of superimposing the processed data 114 output from the arithmetic processing circuit 112 on the second radio signal 104B and transmitting it to the semiconductor device 103. Specifically, for example, the transmission/reception circuit 111 is equipped with a modulation circuit which has functions of converting the processed data to serial data in time sequence, "H" or "L", and transmitting the second radio signal 104B whose amplitude is changed in accordance with the serial data. Alternatively, the transmission/reception circuit 111 is equipped with a modulation circuit which has functions of converting the processed data to serial data in time sequence, "H" or "L", and transmitting the second radio signal 104B whose frequency is changed in accordance with the serial data. In other words, the modulation circuit has functions of generating and transmitting the subcarriers having different frequencies used when the semiconductor device 103 transmits first to fourth processing results of the first to fourth functional circuits 105 to 108. The arithmetic processing circuit 112 has functions of outputting the processed data 114 output from the computation processor 113 to the transmission/reception circuit 111, and generating majority decision processed data 115 from the received first to fourth processing data.

Note that the processed data 114 output from the computation processor 113 is subjected to a computation process by addition of parity data or the like in the arithmetic processing circuit 112. Then, the processed data 114 is output as the processed data, to which the parity data is added, to the transmission/reception circuit 111. Therefore, the processed data output from the computation processor 113 may be referred to as first processed data, whereas the processed data output from the arithmetic processing circuit 112 may be referred to as the second processed data. Parity data is used for so-called parity check to make sure that the processed data has been transmitted from the communication device without any trouble. Moreover, a start signal, a synchronization signal, or the like can be added when the processed data is converted into serial data in time sequence, "H" or "L". Here, the start signal is a signal which conveys starting of data transmission, and for example, the start signal is a signal which is at "L" for a certain period of time. The synchronization signal is a signal which synchronizes an internal clock in the semiconductor device 103, and for example, the synchronization signal is a signal which is at "L" for predetermined times at a regular time intervals.

Figure 8:
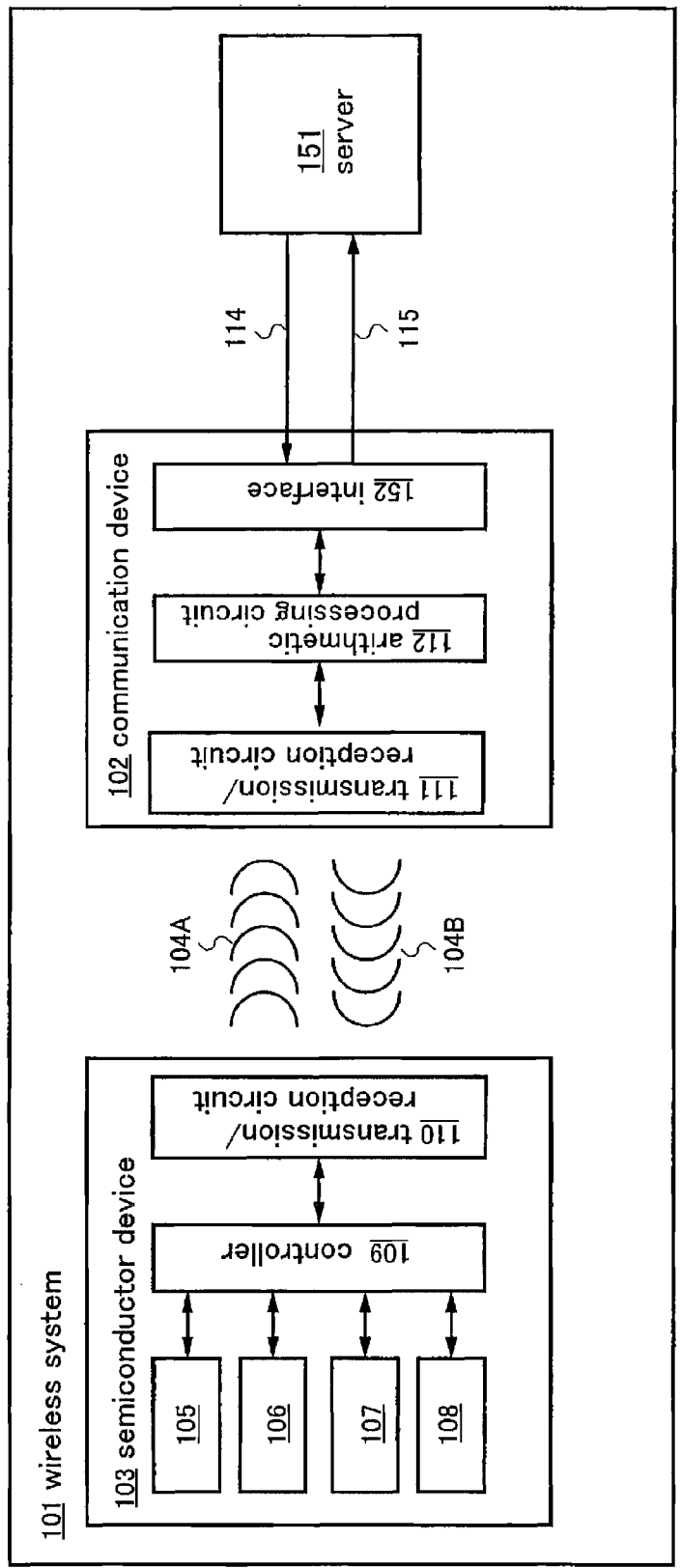
FIG. 8 is a block diagram of a wireless system in the present invention.

Note that, in the present invention, even though the computation processor 113 is provided outside of the communication device 102 in FIG. 1, the communication device 102 can include the computation processor 113. A structure in which a function of the computation processor is performed by a server provided outside of the communication device will be described with reference to FIG. 8. In FIG. 8, only difference from FIG. 1 will be described. The wireless system 101 in FIG. 8 includes the communication device 102, the semiconductor device 103, and a server 151. The communication device 102 includes the transmission/reception circuit 111, the arithmetic processing circuit 112, and a interface 152.

The server 151 shown in FIG. 8 is a computation processing device in which application software of the wireless system is operating. Moreover, for example, a personal computer (PC), a workstation (WS), or a so-called cluster in which personal computers or workstations are connected on a network can be used as the server 151 in accordance with an arithmetic capacity for execution of the application software. Note that the server 151 has functions of outputting the processed data 114 to the communication device 102 depending on a content of execution of the application software, and receiving majority decision processed data 115 from the communication device 102. Here, the processed data 114 includes a command to be executed in the semiconductor device 103, data required for execution of the command, and the like.

In the semiconductor device 103, the transmission/reception circuit 110 has a function of extracting the processed data superimposed on the second radio signal 104B which is transmitted from the communication device 102. Specifically, for example, the transmission/reception circuit 110 may be equipped with a demodulation circuit which has functions of extracting serial data in time sequence, "H" or "L", in accordance with a change in amplitude of the second radio signal 104B, and regenerating the processed data in accordance with a specification of communication. Moreover, the transmission/reception circuit 110 has functions of superimposing first to fourth processing results of the first to fourth functional circuits 105 to 108, on the first radio signal 104A as first to fourth processing data, respectively, and transmitting them to the communication device 102. Specifically, for example, the transmission/reception circuit 110 may be equipped with a modulation circuit which has functions of converting the first to fourth processing data into serial data in time sequence, "H" or "L", and transmitting the first radio signal 104A whose amplitude is changed in accordance with the serial data. In other words, the modulation circuit included in the transmission/reception circuit 110 has function of superimposing the first to fourth processing results of the first to fourth functional circuits 105 to 108 on the first radio signal 104A, and has function of transmitting the subcarriers each having different frequencies to the communication device 102.

The controller 109 has functions of retrieving a command, data required for execution of the command, and the like from the processed data, and outputting them to the first to fourth functional circuits 105 to 108. In addition, the controller 109 receives the first to fourth processing results from the first to fourth functional circuits 105 to 108, respectively, and outputs them to the transmission/reception circuit 110 as first to fourth processing data.

The first to fourth functional circuits 105 to 108 execute a command by appropriately using the command, the data required for execution of the command, and the like which are received from the controller 109. Examples of the command include a unique ID number readout command, a decoding processing command, and a coding processing command. Note that each of the first to fourth functional circuits 105 to 108 performs the same process in accordance with the command.

In the communication device 102, the majority decision processed data 115 is generated by comparison of each content included in first to fourth processing data and by selection of a major content as a normal content from them, in other words, by majority decision processing. Therefore, when all of the first to fourth processing data has a first content, it is employed as the majority decision processed data 115. Further, for example, when all of the first, second, and fourth processing data has a second content, and when the third processing data has a third content, the second content is employed as the majority decision processed data 115. Furthermore, when the first and second processing data have a fourth content, when the third processing data has a fifth content, and when the fourth processing data has a sixth content, the fourth content is employed as the majority decision processed data 115. In this manner, upon generation of the majority decision processed data 115, a normal content can be retrieved as the majority decision processed data by a majority decision process even if at least one of the first to fourth processing data has an error; in other words, even if at least one of the first to fourth functional circuits 105 to 108 malfunctions due to mechanical or electrical breakdown in the semiconductor device 103.

As an algorithm for majority decision, a method, in which a data column of equal to or more than 2 bits in a content of the first to fourth processing data is processed by pattern matching, can be given. In this method, for example, a normal content can be retrieved even if up to two out of four processing data have errors. Generally, a normal content can be retrieved even if up to (n=2) out of n processing data have errors. Therefore, reliability of the semiconductor device 103 in the case of malfunction due to mechanical or electrical breakdown can be improved.

Note that a majority decision process can be achieved by a method of processing using dedicated hardware, a method of processing using software and a CPU, a combination of these two methods, or the like. The method of processing using dedicated hardware can shorten processing time. Further, the method of processing using software can easily deal with a system change and the like. Furthermore, the combination of these two methods can take both advantages.

In addition, the above-described majority decision process will be specifically described with reference to a flowchart in FIG. 7. First, the first to fourth processing data received from the semiconductor device are input to the arithmetic processing circuit 112 (data input 701). Here, every single bit of the first to fourth data is input.

Next, the majority decision process is performed in the arithmetic processing circuit 112. In the majority decision process, processing data having errors are removed from the first to fourth processing data (error data removal 702). Error data removal is achieved by storing the number of processing data that are determined to have errors in the foregoing majority decision process, and retrieving only processing data except that corresponding to the stored number. Here, the numbers of the first to fourth processing data are 1 to 4, respectively.

Next, whether all processing data are "H" or not is determined (first comparative determination 703). If the answer is "Yes" in the first comparative determination 703, "H" is obtained as the majority decision processed data 115 (first data extraction 708). On the other hand, if the answer is "No" in the first comparative determination 703, whether all processing data are "L" or not is determined (second comparative determination 704). If the answer is "Yes" in the second comparative determination 704, "L" is obtained as the majority decision processed data 115 (second data extraction 709).

Determination "No" in the second comparative determination 704 means that some of the first to fourth processing data have errors; therefore, determination by majority decision is required. Here, whether there are more "H" than "L" in the first to fourth processing data or not is determined (majority decision determination 705). If the answer is "Yes" in the majority decision determination 705, the number of processing data which is L, that is, the number of processing data having an error is extracted (first bad data extraction 706), and the extracted number of the processing data is stored to be used in the following error data removal 702. Moreover, as the majority decision processed data 115, "H" is obtained (third data extraction 710).

On the other hand, if the answer is "No" in the majority decision determination 705, the number of processing data which is "H", that is, the number of processing data having an error is extracted (second error data extraction 707), and the extracted number of the processing data is stored to be used in the following error data removal 702. Moreover, as the majority decision processed data 115, "L" is obtained (fourth data extraction 711).

Through the first to fourth data extraction 708 to 711, a majority decision process of the bits in the first to fourth processing data is completed. The majority decision process of bits starting from the data input 701 will be continued to be executed. As described above, by repeating a majority decision process for each bit, majority decision process of the first to fourth processing data is completed.

In the wireless system in the present invention which is described in this embodiment, even if at least one of the first to fourth functional circuits 105 to 108 in the semiconductor device 103 malfunctions, a normal content can be retrieved by a majority decision process. A communication method using the radio signal 104 for easily achieving that process is described with reference to FIGS. 2 to 3D.

FIG. 2 illustrates envelope curves of the waveforms of transmission signals from the semiconductor device 103 to the communication device 102. A first communication signal waveform 201 is an envelope curve of the waveform of a communication signal when all the first to fourth functional circuits 105 to 108 in the semiconductor device 103 are normally operating. A second communication signal waveform 202 is an envelope curve of the waveform of a communication signal when the second functional circuit 106 and the third functional circuit 107 in the semiconductor device 103 malfunction due to mechanical or electrical breakdown. Note that a third communication signal waveform 203, a fourth communication signal waveform 204, a fifth communication signal waveform 205, and a sixth communication signal waveform 206 are envelope curves of the waveforms of communication signals when each of the first to fourth processing data of the first to fourth functional circuits 105 to 108 are independently transmitted.

In FIG. 2, each of a first period 207 and a second period 208 is a period during which "H" or "L" is being transmitted as normal data. Therefore, the first to fourth processing data of the first to fourth functional circuits 105 to 108 are modulated and are superimposed on radio signals by using first to fourth subcarriers, respectively, each having different frequencies. Note that the first communication signal waveform 201 has a waveform on which the third to sixth communication signal waveforms 203 to 206 are superimposed.

Although this embodiment describes a specification of communication in which the amplitude of an envelope curve of the waveform of a communication signal changes when "H" is transmitted as nominal data, whereas the amplitude of an envelope curve of the waveform of a communication signal does not change when "L" is transmitted as normal data, other specifications of communication can be employed.

Figure 3B:
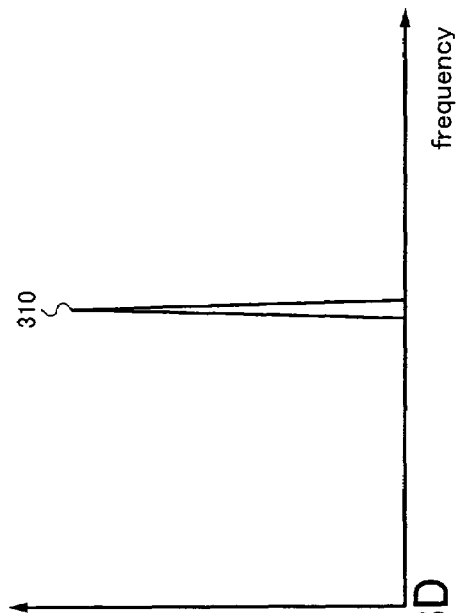
FIGS. 3A to 3D illustrate Fourier transform in waveforms of communication signals between a semiconductor device and a communication device in a wireless system of the present invention.
Figure 3A:
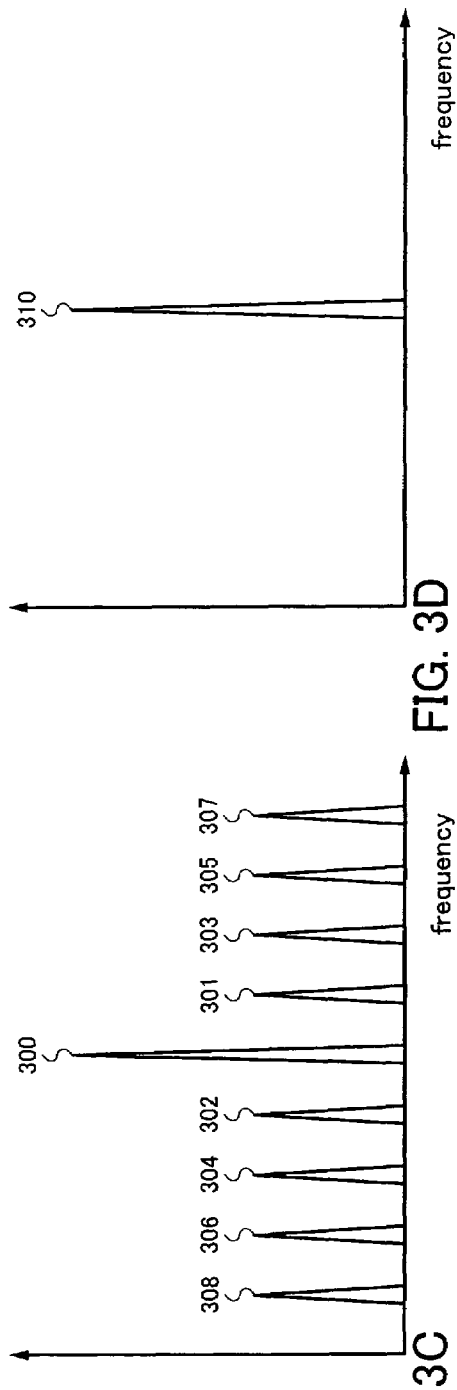

FIGS. 3A and 3B illustrate Fourier transform waveforms of the first communication signal waveform 201 shown in FIG. 2 during the first period 207 and the second period 208, respectively. In FIG. 3A, a first peak 300 is a main peak which corresponds to the frequency of the communication signal. A second peak 301 and a third peak 302 are peaks corresponding to the frequency of the first subcarrier, a fourth peak 303 and a fifth peak 304 are peaks corresponding to the frequency of the second subcarrier, a sixth peak 305 and a seventh peak 306 are peaks corresponding to the frequency of the third subcarrier, and an eighth peak 307 and a ninth peak 308 are peaks corresponding to the frequency of the fourth subcarrier. As for one subcarrier, a peak corresponding to the subcarrier appears in frequency in which the frequency of the subcarrier is added or subtracted to/from the frequency of the communication signal. In addition, in FIG. 3B, a tenth peak 310 is a main peak corresponding to the frequency of the communication signal. As described above, in the communication device 102, the first to fourth processing results can be obtained by transforming a communication signal by Fourier transform, and determining whether a peak corresponding to the frequencies of the first to fourth subcarriers emerges or not.

Figure 3D:
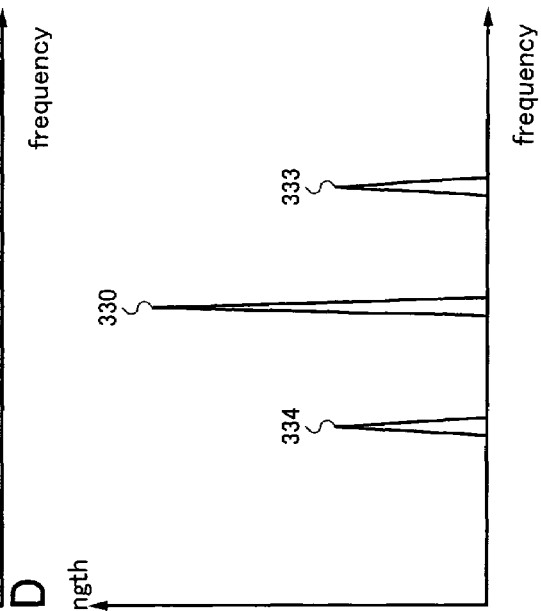
Figure 3C:
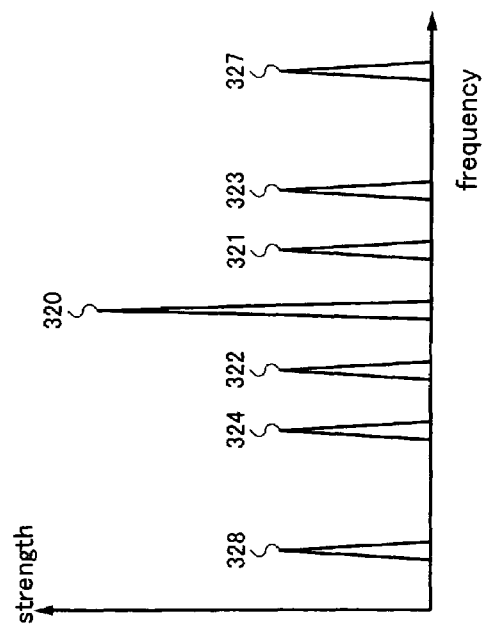

FIGS. 3C and 3D illustrate Fourier transform waveforms of the second communication signal waveform 202 shown in FIG. 2 during the first period 207 and the second period 208, respectively. In FIG. 3C, an eleventh peak 320 is a main peak corresponding to the frequency of the communication signal, a twelfth peak 321 and a thirteenth peak 322 are peaks corresponding to the frequency of the first subcarrier, a fourteenth peak 323 and a fifteenth peak 324 are peaks corresponding to the frequency of the second subcarrier, and a sixteenth peak 327 and a seventeenth peak 328 are peaks corresponding to the frequency of the fourth subcarrier. In addition, in FIG. 3D, an eighteenth peak 330 is a main peak corresponding to the frequency of the communication signal, and a nineteenth peak 333 and a twentieth peak 334 are peaks corresponding to the frequency of the second subcarrier.

A feature of the communication method in the present invention is that the first to fourth processing data of the first to fourth functional circuits 105 to 108 each can be transmitted at the same time after being modulated using the respective first to fourth subcarriers, each having different frequencies. Hereinafter, a reason will be described why a majority decision process can be easily performed in the arithmetic processing circuit 112 by using such a communication method.

A first reason is that the majority decision process can be performed in real time because data is transmitted with temporal continuity. In other words, even when a more number of functional circuits are provided to the semiconductor device 103, the majority decision process can be executed before all processing data are received by the communication device 102. Therefore, a dedicated buffer for storing received data is not necessary and the communication device 102 can be easily provided at a low price. In addition, the processing speed of the communication device 102 and the performance of the wireless system 101 are improved.

Next, a second reason is that when all the first to fourth functional circuits 105 to 108 are normally operating, only the Fourier transform waveform of the first communication signal waveform 201 during the period 207, that is, a waveform shown in FIG. 3A, or the Fourier transform waveform of the first communication signal waveform 201 during the period 208, that is, a waveform shown in FIG. 3B can be observed. Therefore, upon the majority decision process in the arithmetic processing circuit 112, the majority decision processed data 115 can be easily obtained by employing an algorithm which first executes a process which examines whether either of these waveforms emerges. This improves the processing speed of the communication device 102 and the performance of the wireless system 101.

In addition, a third reason is that based on a result of the majority decision process of processing data received previously, the majority decision process of processing data received afterwards can be performed more easily. For example, the Fourier transform waveform in FIG. 3C is different from a waveform when all the functional circuits, described in the second reason above, are normally operating; therefore, the majority decision process should be continued. Here, "H" is employed because the first to fourth processing data are "H", "H", "L", and "H", respectively, according to the peaks corresponding to the first to fourth subcarriers. Moreover, the Fourier transform waveform in FIG. 3D is different from a waveform when all the functional circuits, described in the second reason above, are normally operating; therefore, the majority decision process should be further continued. Here, "L" is employed because the first to fourth processing data are "L", "H", "L", and "L", respectively, according to the peaks corresponding to the first to fourth subcarriers.

From the Fourier transform waveform in FIG. 3C, the third processing data is found to be an error, in other words, the third functional circuit 107 is found to malfunction due to mechanical or electrical breakdown. Therefore, as for the Fourier transform waveform shown in FIG. 3D, a similar result can be obtained even if a majority decision process is executed on the peaks, "L", "H", and "L" corresponding to the respective first, second, and fourth subcarriers besides the peak corresponding to the third subcarrier. Accordingly, the processing speed of the communication device and the performance of the wireless system 101 are improved. Similarly, from the Fourier transform waveform in FIG. 3D, the second processing data is also found to be an error, in other words, the second functional circuit 106 is found to malfunction due to mechanical or electrical breakdown. Therefore, in the following majority decision process, the majority decision process can be executed on only the first and fourth processing data that are obtained from the peaks corresponding to the first and fourth subcarriers. Accordingly, the processing speed of the communication device and the performance of the wireless system 101 are improved. In that case, if the first and fourth processing data are normal, the first processing data can be simply used as the majority decision processed data 115 without any majority decision process; this improves the processing speed of the communication device and the performance of the wireless system 101.

By employing the above-described structure, a wireless system with high reliability, in which a processing result can be obtained from a functional circuit even if some of functional circuits in a semiconductor device cannot give a normal processing result because of mechanical or electrical breakdown, can be provided at a low price.

Embodiment 2

Figure 4:
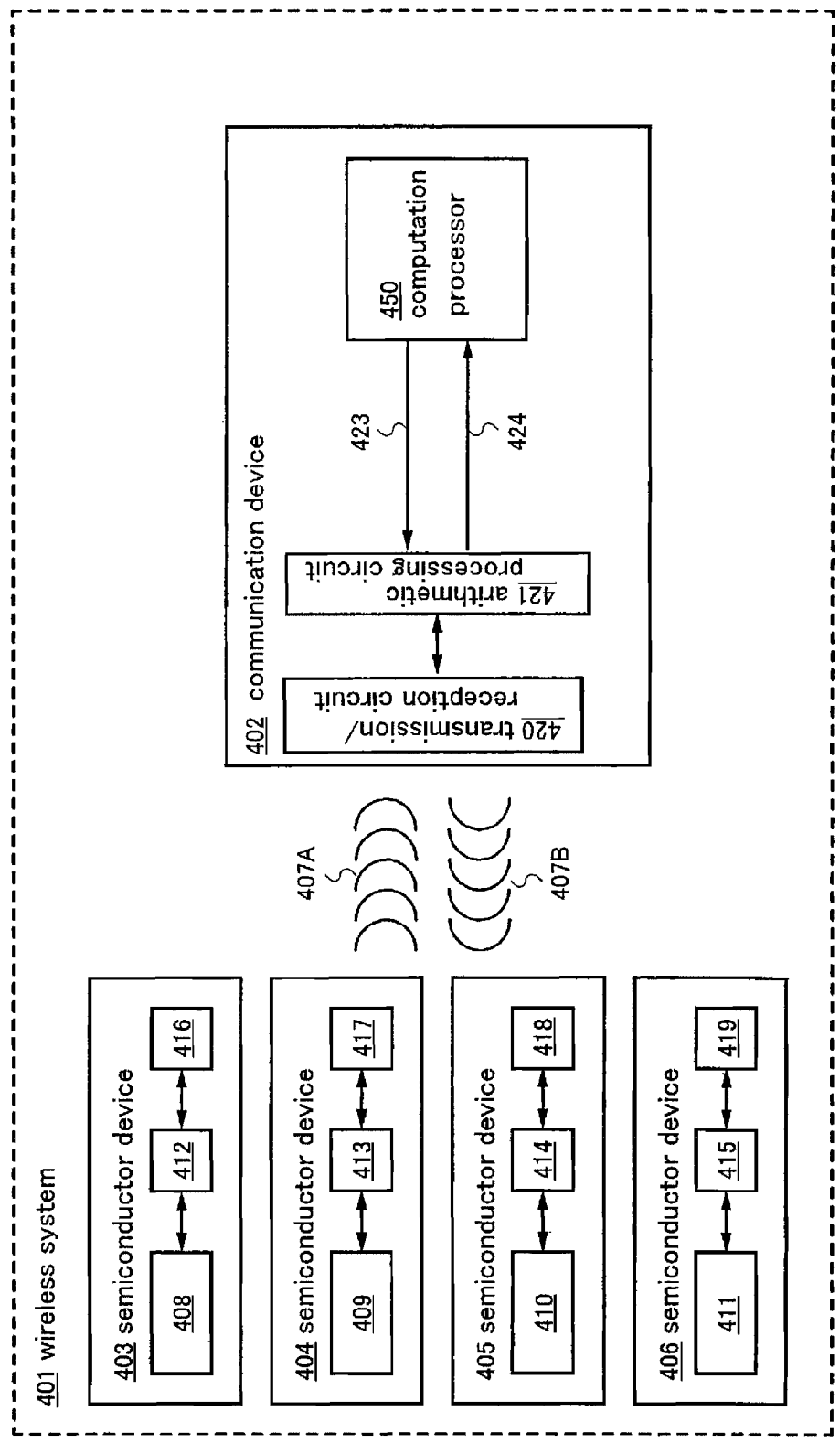
FIG. 4 is a block diagram of a wireless system in the present invention.

In this embodiment, an exemplary structure of a wireless system, which is different from that described in Embodiment 1, will be described with reference to FIGS. 4 to 6D. FIG. 4 is a block diagram of the wireless system of the present invention in this embodiment. FIG. 5 illustrates the waveforms of radio signals in the wireless system of the present invention in this embodiment. FIGS. 6A to 6D are Fourier transform waveforms of radio signals in the wireless system of the present invention in this embodiment.

In FIG. 4, a wireless system 401 includes a communication device 402, a first semiconductor device 403, a second semiconductor device 404, a third semiconductor device 405, and a fourth semiconductor device 406. The communication device 402 and the first to fourth semiconductor devices 403 to 406 transmit and receive information through a first radio signal 407A and a second radio signal 407B. Note that the first radio signal 407A is a signal from the first to fourth semiconductor devices 403 to 406, to the communication device 402, and the second radio signal 407B is a signal from the communication device 402, to the first to fourth semiconductor devices 403 to 406. The first semiconductor device 403 has a first functional circuit 408, a first controller 412, and a first transmission/reception circuit 416, the second semiconductor device 404 has a second functional circuit 409, a second controller 413, and a second transmission/reception circuit 417, the third semiconductor device 405 has a third functional circuit 410, a third controller 414, and a third transmission/reception circuit 418, and the fourth semiconductor device 406 has a fourth functional circuit 411, a fourth controller 415, and a fourth transmission/reception circuit 419; each of the functional circuits, controllers and transmission/reception circuits has the same functions. The communication device 402 has a transmission/reception circuit 420, an arithmetic processing circuit 421, and a computation processor 450. Note that, in this embodiment, the wireless system 401 including four semiconductor devices 403 to 406 is described; however, a description below can be easily extended to the wireless system 401 including n (n is a natural number equal to or more than 3) semiconductor devices.

The computation processor 450 is a computation processing device in which application software of the wireless system in the present invention is operating. Further, the computation processor 450 is designed in accordance with arithmetic capacity required for execution of the application software. Furthermore, the computation processor 450 has functions of outputting processed data 423 to the arithmetic processing circuit 421 according to a content of execution of the application software, and receiving majority decision processed data 424 from the arithmetic processing circuit 421. Here, the processed data 423 includes a command to be executed in the first to fourth semiconductor devices 403 to 406, data required for execution of the command, and the like.

In the communication device 402, the transmission/reception circuit 420 has a function of regenerating first to fourth processing data from the first radio signal 407A transmitted from the first to fourth semiconductor devices 403 to 406. Specifically, the transmission/reception circuit 420 is equipped with a demodulation circuit which has a function of extracting serial data in time sequence, "H" or "L", in accordance with signal strength which corresponds to each different frequency of first to fourth subcarriers by changing the amplitude of the first radio signal 407A by Fourier transform.

In addition, the transmission/reception circuit 420 has functions of superimposing the processed data 423 output from the arithmetic processing circuit 421 on the second radio signal 407B and transmitting it to the first to fourth semiconductor devices 403 to 406. Specifically, for example, the transmission/reception circuit 420 is equipped with a modulation circuit which has functions of converting the processed data to serial data in time sequence, "H" or "L", and transmitting the radio signal 407B whose amplitude is changed in accordance with the serial data. Alternatively, the transmission/reception circuit 420 is equipped with a modulation circuit which has functions of converting the processed data to serial data in time sequence, "H" or "L", and transmitting the radio signal 407B whose frequency is changed in accordance with the serial data. The arithmetic processing circuit 421 has functions of outputting the processed data 423 output from the computation processor 450 to the transmission/reception circuit 420, and generating the majority decision processed data 424 from the first to fourth processing data.

Note that the processed data 423 output from the computation processor 450 is subjected to a computation process by addition of parity data or the like in the arithmetic processing circuit 421, and then output to the transmission/reception circuit 420. Therefore, the processed data output from the computation processor 450 may be referred to as first processed data whereas the processed data output from the arithmetic processing circuit 421 may be referred to as second processed data. Parity data is used for so-called parity check to make sure if the processed data has been transmitted from the communication device without any trouble. Moreover, a start signal, a synchronization signal, or the like can be added when the second processed data is converted into serial data in time sequence, "H" or "L". Here, the start signal is a signal which conveys starting of data transmission, and for example, the start signal is a signal which is at "L" for a certain period of time. The synchronization signal is a signal which synchronizes an internal clock in each of the first to fourth semiconductor devices 403 to 406, and for example, the synchronization signal is a signal which is at "L" for predetermined times at regular time intervals.

Note that, in the present invention, even though the communication device 402 in FIG. 4 includes the computation processor 450, the computation processor 450 can be provided outside of the communication device 402, as with the communication device in FIG. 8 shown in Embodiment 1.

In the first semiconductor device 403, the first transmission/reception circuit 416 has a function of extracting the processed data superimposed on the second radio signal 407B which is transmitted from the communication device 402. Specifically, for example, the first transmission/reception circuit 416 may be equipped with a demodulation circuit which has functions of extracting serial data in time sequence, "H" or "L", in accordance with a change in amplitude of the second radio signal 407B, and regenerating the processed data in accordance with a specification of communication. Moreover, the first transmission/reception circuit 416 has functions of superimposing first processing data in the first functional circuit 408 on the first radio signal 407A using a first subcarrier, and transmitting it to the communication device 402. Specifically, for example, the first transmission/reception circuit 416 may be equipped with a modulation circuit which has functions of converting the first processing data into serial data in time sequence, "H" or "L", and changing amplitude of the serial data using the first subcarrier to transmit the first radio signal 407A.

The first controller 412 has functions of retrieving a command, data required for execution of the command, and the like from the processed data, and outputting them to the first functional circuit 408. In addition, the first controller 412 receives a first processing result from the first functional circuit 408, and outputs the first processing result to the first transmission/reception circuit 416 as the first processing data.

The first functional circuit 408 executes a command by appropriately using the command, the data required for execution of the command, and the like, received from the first controller 412. Examples of the command include unique ID number readout command, decoding processing command, coding processing command.

Although only the first semiconductor device 403 has been described, the second to fourth semiconductor devices 404 to 406 are also provided with the structure having the same function as the first semiconductor device. Therefore, a detailed description of the second to fourth semiconductor devices 404 to 406 in this embodiment is skipped.

In the communication device 402, the majority decision processed data 424 is generated by comparison of each content included in the first to fourth processing data and by selection of a major content as a normal content from them, in other words, by majority decision processing. Therefore, when all of the first to fourth processing data have a first content, it is employed as the majority decision processed data 424. Further, for example, when all of the first, second, and fourth processing data have a second content, and when third processing data has a third content, the second content is employed as the majority decision processed data 424. Furthermore, when the first and second processing data have a fourth content, when the third processing data has a fifth content, and when the fourth processing data has a sixth content, the fourth content is employed as the majority decision processed data 424. As described above, upon generation of the majority decision processed data 424, a normal content can be retrieved as the majority decision processed data 424 by a majority decision process even if at least one of the first to fourth processing data has an error, in other words, even if at least one of the first to fourth semiconductor devices 403 to 406 malfunctions due to mechanical or electrical breakdown.

As an algorithm for majority decision, a method, in which a data column of equal to of more than 2 bits in a content of the first to fourth processing data is processed by pattern matching, can be given. In this method, for example, a normal content can be retrieved even if up to two out of four processing data have errors. Generally, a normal content can be retrieved even if up to (n−2) out of n processing data have errors. Therefore, reliability in the case where at least one of the first to fourth semiconductor devices 403 to 406 malfunctions due to mechanical or electrical breakdown can be improved.

Note that majority decision process can be achieved by a method of processing using dedicated hardware, a method of processing using software and a CPU, a combination of these two methods, or the like. The method of processing using dedicated hardware can shorten processing time. Further, the method of processing using software can easily deal with a system change and the like. Furthermore, the combination of these two methods can provide both advantages.

Figure 7:
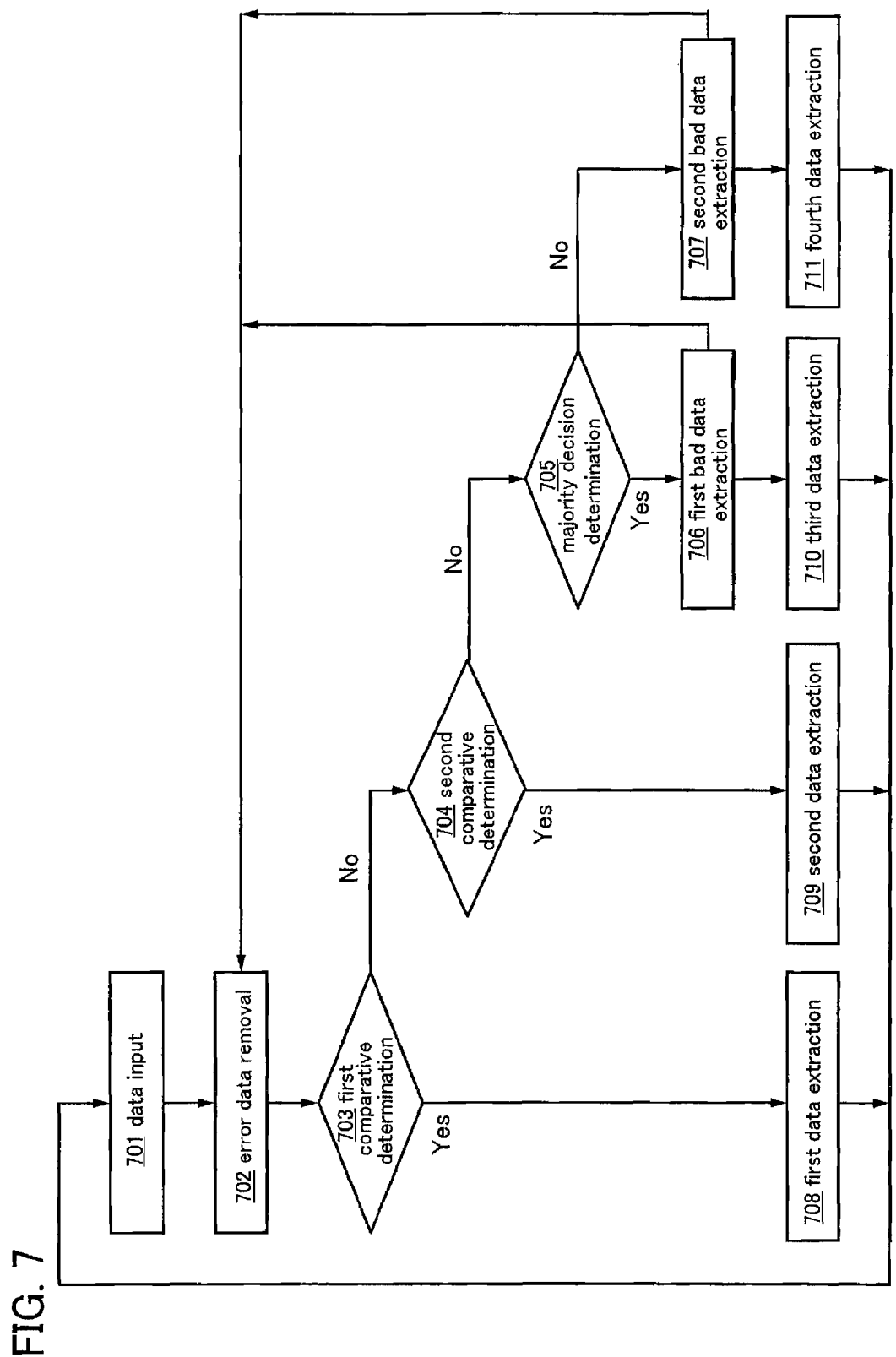
FIG. 7 is a flowchart of a wireless system in the present invention.

Since a detail of a majority decision process in this embodiment is the same as that in the flowchart in FIG. 7 shown in Embodiment 1, the detailed description is skipped in this embodiment.

In the wireless system of the present invention which is described in this embodiment, even if at least one of the first to fourth semiconductor devices 403 to 406 malfunctions, a normal content can be retrieved by a majority decision process. A communication method using the radio signal 407 for easily achieving that process is described with reference to FIGS. 5 to 6D.

FIG. 5 illustrates envelope curves of the waveforms of transmission signals from the first to fourth semiconductor devices 403 to 406, to the communication device 402. A first communication signal waveform 501 is an envelope curve of the waveform of a communication signal when all the first to fourth semiconductor devices 403 to 406 are normally operating. A second communication signal waveform 502 is an envelope curve of the waveform of a communication signal when the second semiconductor device 404 and the third semiconductor device 405 malfunction due to mechanical or electrical breakdown. Note that third to sixth communication signal waveforms 503 to 506 are envelope curves of the waveforms of communication signals when each of the first to fourth processing data of the first to fourth semiconductor devices 403 to 406 are independently transmitted.

In FIG. 5, each of a first period 507 and a second period 508 is a period during which "H" or "L" is being transmitted as normal data. Therefore, the first to fourth processing data of the first to fourth semiconductor devices 403 to 406 are modulated and superimposed on radio signals using first to fourth subcarriers, respectively, each having different frequencies. Note that the first communication signal waveform 501 has a waveform on which the third to sixth communication signal waveforms 503 to 506 are superimposed.

Although this embodiment describes a specification of communication in which the amplitude of an envelope curve of the waveform of a communication signal changes when "H" is transmitted as normal data whereas the amplitude of an envelope curve of the waveform of a communication signal does not change when "L" is transmitted as normal data, other specifications of communication can be employed.

Figure 6A:
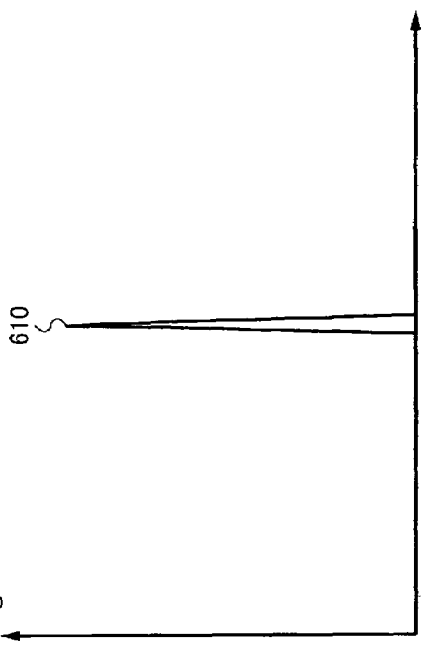
FIGS. 6A to 6D illustrate Fourier transform in waveforms of communication signals between a semiconductor device and a communication device in a wireless system of the present invention.
Figure 6B:
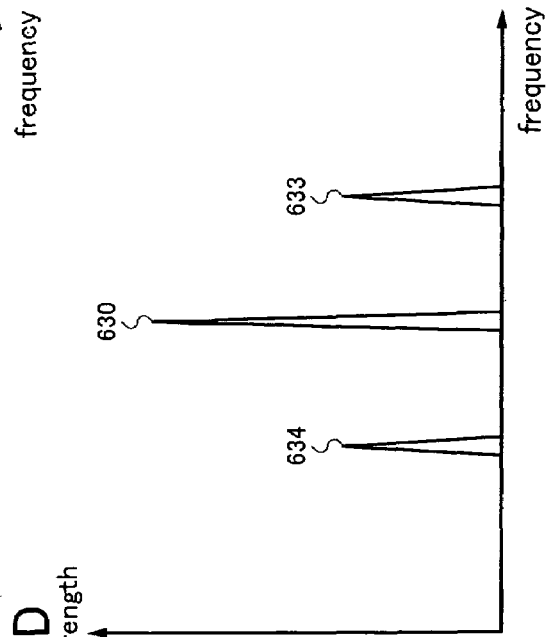

FIGS. 6A and 6B illustrate Fourier transform waveforms of the first communication signal waveform 501 shown in FIG. 5 during the first period 507 and the second period 508, respectively. In FIG. 6A, a first peak 600 is a main peak which corresponds to the frequency of the communication signal. A second peak 601 and a third peak 602 are peaks corresponding to the frequency of the first subcarrier, a fourth peak 603 and a fifth peak 604 are peaks corresponding to frequency of the second subcarrier, a sixth peak 605 and a seventh peak 606 are peaks corresponding to the frequency of the third subcarrier, and an eighth peak 607 and a ninth peak 608 are peaks corresponding to the frequency of the fourth subcarrier. As for one subcarrier, a peak corresponding to the subcarrier appears in frequency in which the frequency of the subcarrier is added or subtracted to/from the frequency of the communication signal. In addition, in FIG. 6B, a tenth peak 610 is a main peak corresponding to the frequency of a communication signal. As described above, in the communication device 402, the first to fourth processing results can be obtained by transforming a communication signal by Fourier transform, and determining whether a peak corresponding to the frequencies of the first to fourth subcarriers emerges or not.

Figure 6C:
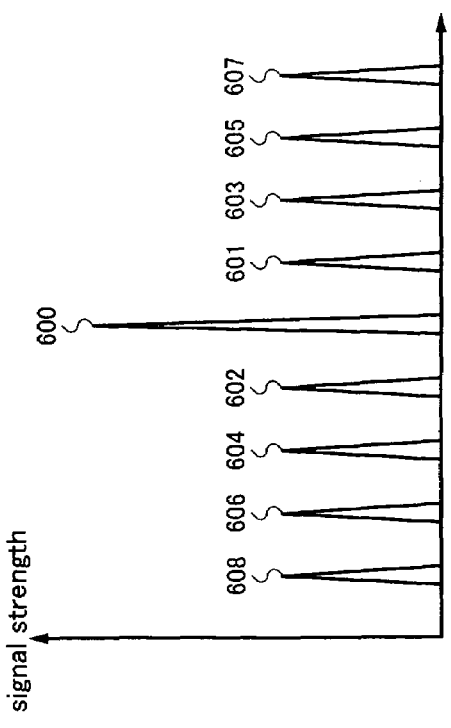
Figure 6D:
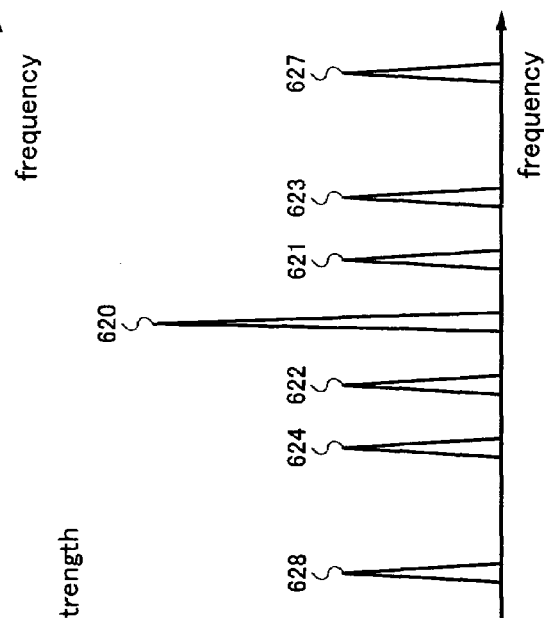

FIGS. 6C and 6D illustrate Fourier transform waveforms of the second communication signal waveform 502 shown in FIG. 5 during the first period 507 and the second period 508, respectively. In FIG. 6C, an eleventh peak 620 is a main peak corresponding to the frequency of the communication signal, a twelfth peak 621 and a thirteenth peak 622 are peaks corresponding to the frequency of the first subcarrier, a fourteenth peak 623 and a fifteenth peak 624 are peaks corresponding to the frequency of the second subcarrier, and a sixteenth peak 627 and a seventeenth peak 628 are peaks corresponding to the frequency of the fourth subcarrier. In addition, in FIG. 6D, an eighteenth peak 630 is a main peak corresponding to the frequency of a communication signal, and a nineteenth peak 633 and a twentieth peak 634 are peaks corresponding to the frequency of the second subcarrier.

A feature of the communication method in the present invention is that each of the first to fourth processing data of the first to fourth semiconductor devices 403 to 406 can be transmitted at the same time after being modulated using the respective first to fourth subcarriers, each having different frequencies. Hereinafter, a reason will be described why a majority decision process can be easily performed in the arithmetic processing circuit 421 by using such transmission specification.

A first reason is that the majority decision process can be performed in real time because data is transmitted with temporal continuity. In other words, even when the wireless system 401 includes a greater number of semiconductor devices, the majority decision process can be executed before all processing data are received by the communication device 402. Therefore, a dedicated buffer for storing received data is not necessary and the communication device 402 can be easily provided at a low price. In addition, the processing speed of the communication device 402 and the performance of the wireless system 401 are improved.

Next, a second reason is that when all the first to fourth semiconductor devices 403 to 406 are normally operating, only the Fourier transform waveform of the first communication signal waveform 501 during the period 507, that is, a waveform shown in FIG. 6A, or the Fourier transform waveform of the first communication signal waveform 501 during the period 508, that is, a waveform shown in FIG. 6B can be observed. Therefore, upon the majority decision process in the arithmetic processing circuit 421, the majority decision processed data 424 can be easily obtained by employing an algorithm which first executes a process which examines whether either of these waveforms emerges. This improves the processing speed of the communication device 402 and the performance of the wireless system 401.

In addition, a third reason is that based on a result of the majority decision process of processing data received previously, the majority decision process of processing data received afterwards can be performed more easily. For example, the Fourier transform waveform in FIG. 6C is different from a waveform when all the semiconductor devices, described in the second reason above, are normally operating; therefore, the majority decision process should be continued. Here, "H" is employed because the first to fourth processing data are "H", "H", "L", and "H", respectively, according to the peaks corresponding to the first to fourth subcarriers. Moreover, the Fourier transform waveform in FIG. 6D is different from a waveform when all the functional circuits, described in the second reason above, are normally operating; therefore, the majority decision process should be further continued. Here, "L" is employed because the first to fourth processing data are "L", "H", "L", and "L", respectively, according to the peaks corresponding to the first to fourth subcarriers.

From the Fourier transform waveform in FIG. 6C, the third processing data is found to be an error, in other words, the third semiconductor device 405 is found to malfunction by mechanical or electrical breakdown. Therefore, as for the Fourier transform waveform shown in FIG. 6D, a similar result can be obtained even if a majority decision process is executed on the peaks, "L", "H", and "L" corresponding to the first, second, and fourth subcarriers besides the peak corresponding to the third subcarrier. Accordingly, the processing speed of the communication device 402 and the performance of the wireless system 401 are improved. Similarly, from the Fourier transform waveform in FIG. 6D, the second processing data is also found to be an error, in other words, the second semiconductor device 404 is found to malfunction due to mechanical or electrical breakdown. Therefore, in the following majority decision process, the majority decision process can be executed on only the first and fourth processing data that are obtained from the peaks corresponding to the first and fourth subcarriers. Accordingly, the processing speed of the communication device 402 and the performance of the wireless system 401 are improved. In that case, if the first and fourth processing data are normal, the first processing data can be simply used as the majority decision processed data 424 without any majority decision process; this improves the processing speed of the communication device 402 and the performance of the wireless system 401.

By employing the above-described structure, a wireless system with high reliability, in which a normal processing result can be obtained from a semiconductor device even if one of semiconductor devices cannot give a normal processing result because of mechanical or electrical breakdown, can be provided.

Embodiment 3

In this embodiment, one example of a manufacturing method of the semiconductor device, described in the above embodiment, will be described with reference to the drawings. In this embodiment, a structure will be described in which a semiconductor device and an antenna circuit are provided over the same substrate. By forming an antenna circuit and a semiconductor device over the same substrate, and using a thin film transistor as a transistor which forms the semiconductor device, a small-size semiconductor device can be provided.

Figure 9A:
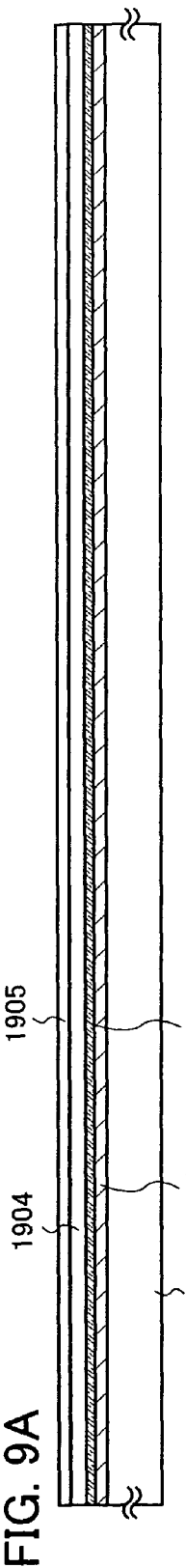
FIGS. 9A to 9D are cross-sectional views of a semiconductor device in the present invention.

First, as shown in FIG. 9A, a release layer 1903 is formed over one surface of a substrate 1901 with an insulating film 1902 interposed therebetween, and an insulating film 1904 which functions as a base film, and a semiconductor film 1905 (e.g., a film containing amorphous silicon) are stacked. Note that the insulating film 1902, the release layer 1903, the insulating film 1904, and the semiconductor film 1905 can be sequentially formed.

Note that the substrate 1901 can be selected from a glass substrate, a quartz substrate, a metal substrate (e.g., a stainless steel substrate), a ceramic substrate, or a semiconductor substrate such as a Si substrate. Alternatively, as a plastic substrate, a substrate made of polyethylene terephthalate (PET), polyethylene naphthalate (PEN), polyether sulfone (PES), acrylic, or the like can be selected. Although the release layer 1903 is formed over the entire surface of the substrate 1901 with the insulating film 1902 interposed therebetween, the release layer 1903 can be selectively patterned as appropriate by a photolithography method after the release layer is formed over the entire surface of the substrate 1901.

The insulating films 1902 and 1904 are formed using an insulating material such as silicon oxide, silicon nitride, silicon oxynitride ($SiO_xN_y$) (x>y>0), or silicon nitride oxide ($SiN_xO_y$) (x>y>0), by CVD, sputtering, or the like. For example, in the case where the insulating films 1902 and 1904 each have a two-layer structure, a silicon nitride oxide film may be formed as a first-layer insulating film and a silicon oxynitride film may be formed as a second-layer insulating film. Alternatively, a silicon nitride film may be formed as the first-layer insulating film and a silicon oxide film may be formed as the second-layer insulating film. The insulating film 1902 functions as a blocking layer which prevents an impurity element from being mixed from the substrate 1901 into the release layer 1903 or an element formed over the release layer 1903, and the insulating film 1904 functions as a blocking layer which prevents an impurity element from being mixed from the substrate 1901 and the release layer 1903 into an element formed over the release layer 1903. By forming the insulating films 1902 and 1904 which function as blocking layers in this manner, it is possible to prevent alkaline earth metal or alkali metal such as Na in the substrate 1901, and an impurity element in the release layer 1903, from adversely affecting the element to be formed over the release layer 1903. In the case of using quartz as the substrate 1901, the insulating films 1902 and 1904 may be omitted.

As the release layer 1903, a metal film, a stacked-layer structure of a metal film and a metal oxide film, or the like can be used. As the metal film, a single-layer structure or a stacked-layer structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material containing an above-described element as its main component may be employed. In addition, these materials can be formed by using sputtering, various kinds of CVD such as plasma CVD, or the like. In order to obtain the stacked-structure of the metal film and the metal oxide film, plasma treatment under oxygen atmosphere or $N_2O$ atmosphere is performed or thermal treatment under oxygen atmosphere or $N_2O$ atmosphere is performed after the aforementioned metal film is formed. Thus, oxide or oxynitride of the metal film can be provided on the surface of the metal film. For example, in the case of providing a tungsten film by sputtering, CVD, or the like as the metal film, plasma treatment is performed to the tungsten film so that a metal oxide film which is formed of tungsten oxide can be provided on the surface of the tungsten film. In this case, tungsten oxide is represented by $WO_x$, where x is 2 to 3. There are cases where x is 2 ($WO_2$), x is 2.5 ($W_2O_5$), x is 2.75 ($W_4O_{11}$), x is 3 ($WO_3$), and the like. In forming tungsten oxide, the value of x is not limited to the aforementioned examples, and thus, which kind of oxide is to be formed may be determined based on the etching rate or the like. Further, high-density plasma treatment may be performed as plasma treatment. Metal nitride or metal oxynitride may be used in addition to the metal oxide film. In this case, plasma treatment or thermal treatment may be performed to the metal film under nitrogen atmosphere or nitrogen and oxygen atmosphere.

The semiconductor film 1905 is formed to have a thickness of 25 to 200 nm (preferably, 30 to 150 nm) by sputtering, LPCVD, plasma CVD, or the like.

Figure 9B:
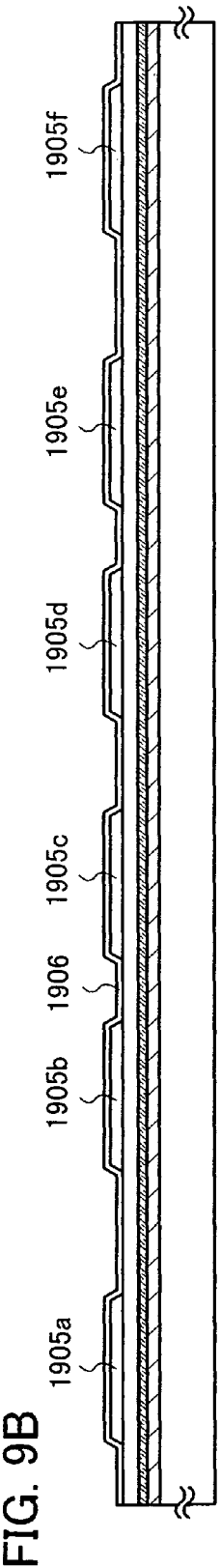

Next, as shown in FIG. 9B, the semiconductor film 1905 is irradiated with a laser beam to be crystallized. Note that the semiconductor film 1905 may be crystallized by a method in which laser beam irradiation is combined with thermal crystallization using an RTA or an annealing furnace or thermal crystallization using a metal element which promotes crystallization. After that, a crystalline semiconductor film obtained is etched into a desired shape to form crystalline semiconductor films 1905a to 1905f, and a gate insulating film 1906 is formed so as to cover the crystalline semiconductor films 1905a to 1905f.

The gate insulating film 1906 is formed by using an insulating material such as silicon oxide, silicon nitride, silicon oxynitride ($SiO_xN_y$) (x>y>0), or silicon nitride oxide ($SiN_xO_y$) (x>y>0) by CVD, sputtering, or the like. For example, in the case where the gate insulating film 1906 is formed to have a two-layer structure, a silicon nitride oxide film may be formed as a first-layer insulating film, and a silicon oxynitride film may be formed as a second-layer insulating film. Alternatively, a silicon oxide film may be formed as the first-layer insulating film and a silicon nitride film may be formed as the second-layer insulating film.

An example of manufacturing steps of the crystalline semiconductor films 1905a to 1905f is briefly described below. First, an amorphous semiconductor film having a film thickness of 50 to 60 nm is formed by plasma CVD. Next, a crystalline semiconductor film is formed by performing dehydrogenation treatment (500° C., 1 hour) and thermal crystallization treatment (550° C., 4 hours) to the amorphous semiconductor film after a solution including nickel which is a metal element for promoting crystallization is held over the amorphous semiconductor film. After that, the crystalline semiconductor films 1905a to 1905f are formed by being irradiated with a laser beam and photolithography. Note that the amorphous semiconductor film may also be crystallized only by irradiation with a laser beam without performing thermal crystallization using a metal element which promotes crystallization.

As a laser oscillator which is used for crystallization, a continuous wave laser beam (a CW laser beam) or a pulsed laser beam can be used. As a laser beam which can be used here, laser beams which are emitted from one or a plurality of laser beams from a gas laser such as an Ar laser, a Kr laser, or an excimer laser, a laser using a medium in which one or a plurality of elements of Nd, Yb, Cr, Ti, Ho, Er, Tm, and Ta is added as a dopant into single crystals of YAG, $YVO_4$, forsterite ($Mg_2SiO_4$), $YAlO_3$, or $GdVO_4$, or polycrystals (ceramic) of YAG; $Y_2O_3$, $YVO_4$, $YAlO_3$, or $GdVO_4$, a glass laser, a ruby laser, an alexandrite laser, a Ti:sapphire laser, a copper vapor laser, or a gold vapor laser can be given. By laser beam irradiation with a fundamental wave of such laser beam and a second harmonic wave to a fourth harmonic wave of the fundamental wave of such laser beam, a crystal having a large particle size can be obtained. For example, a second harmonic wave (532 nm) or a third harmonic wave (355 nm) of an Nd:$YVO_4$ laser (having a fundamental wave of 1064 nm) can be used. At this time, power density of the laser is required to be about 0.01 to 100 $MW/cm^2$ (preferably, 0.1 to 10 $MW/cm^2$). Irradiation is performed by setting the scan speed at about 10 to 2000 cm/sec. Note that the laser using a medium in which one or a plurality of elements of Nd, Yb, Cr, Ti, Ho, Er, Tm, and Ta is added as a dopant into single crystals of YAG, $YVO_4$, forsterite ($Mg_2SiO_4$), $YAlO_3$, or $GdVO_4$, or polycrystals (ceramic) of YAG, $Y_2O_3$, $YVO_4$, $YAlO_3$, or $GdVO_4$, an Ar ion laser, or the Ti:sapphire laser can be continuously oscillated, and can also be pulsed oscillated with a repetition rate of 10 MHz or more by performing a Q-switching operation, mode locking, or the like. When the laser beam is emitted with the repetition rate of 10 MHz or more, a semiconductor film is irradiated with the next pulse during the period in which the semiconductor film is melted by the laser beam and solidified. Accordingly, a solid-fluid interface can be continuously moved in the semiconductor film so that crystal grains which have grown continuously in the scan direction can be obtained, unlike the case of using a pulsed laser with a low repetition rate.

In addition, the gate insulating film 1906 may be formed by performing the aforementioned high-density plasma treatment to the semiconductor films 1905a to 1905f and oxidizing or nitriding surfaces thereof. For example, the gate insulating film 1906 is formed by plasma treatment with a mixed gas of noble gas such as He, Ar, Kr, or Xe, and oxygen, nitrogen oxide ($NO_2$), ammonia, nitrogen, or hydrogen. By performing excitation of plasma in this case with introduction of a microwave, plasma with a low electron temperature and high density can be generated. By oxygen radical (there is the case in which OH radical is included) or nitrogen radical (there is the case in which NH radical is included), the surface of the semiconductor films can be oxidized or nitrided.

By such treatment using high-density plasma, an insulating film of 1 to 20 nm, typically, 5 to 10 nm is formed over the semiconductor film. Since reaction in this case is solid-phase reaction, interface state density between the insulating film and the semiconductor films can be extremely lowered. Since such high-density plasma treatment directly oxidizes (or nitrides) the semiconductor films (crystalline silicon or polycrystalline silicon), variation in the thickness of the insulating film to be formed can be extremely reduced, ideally. In addition, since oxidization is not strongly performed in the crystal grain boundary of crystalline silicon, an extremely preferable state is obtained. That is, by solid-phase oxidizing the surface of the semiconductor film by plasma treatment shown here, an insulating film with excellent uniformity and low interface state density can be formed without unusual oxidizing reaction in the crystal grain boundary.

Only an insulating film foamed by high-density plasma treatment may be used for the gate insulating film 1906, or an insulating film such as silicon oxide, silicon oxynitride, or silicon nitride may be deposited to be stacked thereover by CVD utilizing plasma or thermal reaction. In any case, in a transistor which is formed to include an insulating film formed by high-density plasma treatment in a part or all of a gate insulating film, characteristic variation can be reduced.

In addition, in the semiconductor films 1905a to 1905f which are obtained by scanning in one direction to be crystallized while the semiconductor films are irradiated with a continuous wave laser or laser beam which is emitted with a repetition rate of 10 MHz or more, characteristics such that crystals grow in a scan direction of the beam exist. A transistor is arranged by adjusting the scan direction to a channel length direction (a direction in which a carrier flows when a channel formation region is formed) and the gate insulating layer is combined with the transistor, so that a thin film transistor (a TFT: thin film transistor) with little characteristic variation and high field effect mobility can be obtained.

Next, a first conductive film and a second conductive film are stacked over the gate insulating film 1906. Here, the first conductive film is formed to have a thickness of 20 to 100 nm by CVD, sputtering, or the like. The second conductive film is formed to have a thickness of 100 to 400 nm. The first conductive film and the second conductive film are formed of an element selected from tantalum (Ta), tungsten (W), titanium (Ti), molybdenum (Mo), aluminum (Al), copper (Cu), chromium (Cr), niobium (Nb), or the like, or an alloy material or a compound material which includes any of these elements as a main component. Alternatively, the first conductive film and the second conductive film are formed of a semiconductor material typified by polycrystalline silicon doped with an impurity element such as phosphorus. As an example of a combination of the first conductive film and the second conductive film, a tantalum nitride film and a tungsten film, a tungsten nitride film and a tungsten film, a molybdenum nitride film and a molybdenum film, or the like can be given. Since tungsten and tantalum nitride have high thermal resistance, thermal treatment aimed at thermal activation can be performed after the first conductive film and the second conductive film are formed. In addition, in the case of a three-layer structure, a stacked-layer structure of a molybdenum film, an aluminum film, and a molybdenum film may be employed.

Next, a resist mask is formed by photolithography and a gate electrode 1907 is formed above each of the semiconductor films 1905a to 1905f by performing etching for forming the gate electrode and a gate line. Here, an example in which a stacked-layer structure of a first conductive film 1907a and a second conductive film 1907b is provided as the gate electrode 1907 is shown.

Figure 9C:
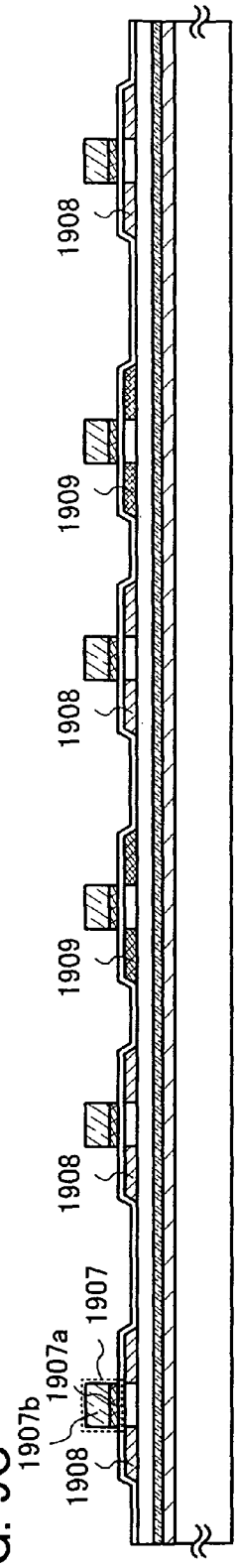

Next, as shown in FIG. 9C, an impurity element which imparts n-type conductivity with low concentration is introduced into the semiconductor films 1905a to 1905f by using the gate electrode 1907 as a mask by ion doping or ion implantation, and then, the resist mask is selectively formed by photolithography and an impurity element which imparts p-type conductivity with high concentration is introduced into the semiconductor films 1905a to 1905f. As an impurity element which imparts n-type conductivity, phosphorus (P), arsenic (As), or the like can be used. As an impurity element which imparts p-type conductivity, boron (B), aluminum (Al), gallium (Ga), or the like can be used. Here, phosphorus (P) is used as the impurity element which imparts n-type conductivity, and phosphorus (P) is selectively introduced to the semiconductor films 1905a to 1905f so as to be included therein with a concentration of $1\times10^{15}$ to $1\times10^{19}/cm^3$ to form an impurity region 1908 having n-type conductivity. Further, boron (B) is used as the impurity element which imparts p-type conductivity, and boron (B) is selectively introduced into the semiconductor films 1905c and 1905e so as to be included therein with a concentration of $1\times10^{19}$ to $1\times10^{20}/cm^3$ to form an impurity region 1909 which imparts p-type conductivity.

Sequentially, an insulating film is formed so as to cover the gate insulating film 1906 and the gate electrode 1907. The insulating film is formed with a single-layer structure or a stacked-layer structure of a film including an inorganic material such as silicon, silicon oxide, or silicon nitride, or a film including an organic material such as an organic resin by plasma CVD, sputtering, or the like. Next, the insulating film is selectively etched by anisotropic etching which is based on a perpendicular direction to form an insulating film 1910 (also described as a sidewall) which is in contact with a side of the gate electrode 1907. The insulating film 1910 is used as a doping mask when a LDD (lightly doped drain) region is formed.

Sequentially, an impurity element which imparts n-type conductivity with high concentration is introduced into the semiconductor films 1905a, 1905b, 1905d, and 1905f by using the resist mask, which is formed by photolithography as well as gate electrode 1907 and the insulating film 1910 as masks, and an impurity region 1911 having n-type conductivity is formed. Here, phosphorus (P) is used as the impurity element which imparts n-type conductivity, and phosphorus (P) is selectively introduced into the semiconductor films 1905a, 1905b, 1905d, and 1905f so as to be included therein with a concentration of $1\times10^{19}$ to $1\times10^{20}/cm^3$ to form the impurity region 1911 imparting n-type conductivity with a higher concentration than that of the impurity region 1908.

Figure 9D:
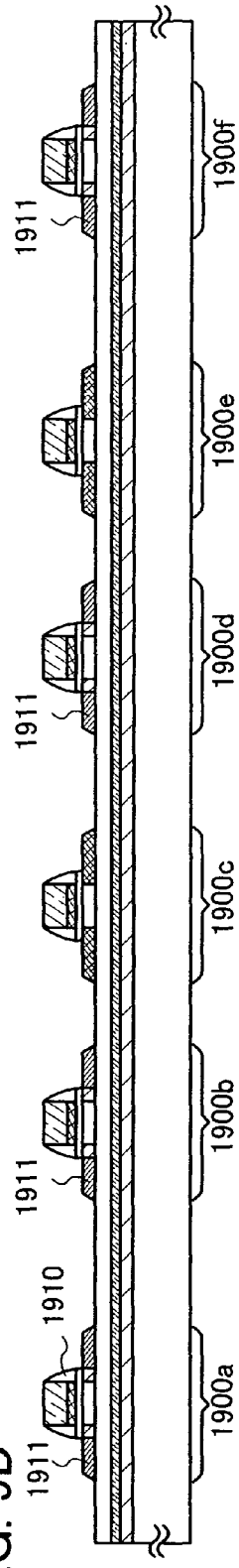

By the aforementioned steps, as shown in FIG. 9D, n-channel thin film transistors 1900a, 1900b, 1900d, and 1900f and p-channel thin film transistors 1900c and 1900e are formed.

In the n-channel thin film transistor 1900a, a channel formation region is formed in a region of the semiconductor film 1905a which overlaps with the gate electrode 1907; the impurity region 1911 which forms a source region or a drain region is formed in a region of the semiconductor film 1905a which does not overlap with the gate electrode 1907 and the insulating film 1910; and a low concentration impurity region (an LDD region) is formed in a region of the semiconductor film 1905a which overlaps with the insulating film 1910 and between the channel formation region and the impurity region 1911. Similarly, in each of the n-channel thin film transistors 1900b, 1900d, and 1900f, a channel formation region, a low concentration impurity region, and the impurity region 1911 are formed.

In the p-channel thin film transistor 1900c, a channel formation region is formed in a region of the semiconductor film 1905c which overlaps with the gate electrode 1907, and the impurity region 1909 which forms a source region or a drain region is formed in a region of the semiconductor film 1905c which does not overlap with the gate electrode 1907. Similarly, in the p-channel thin film transistor 1900e, a channel formation region and an impurity region 1909 are formed. Note that although an LDD region is not provided in each of the p-channel thin film transistors 1900c and 1900e here, an LDD region may be provided in each of the p-channel thin film transistors or a structure in which an LDD region is not provided in each of the n-channel thin film transistors may also be employed.

Figure 10A:
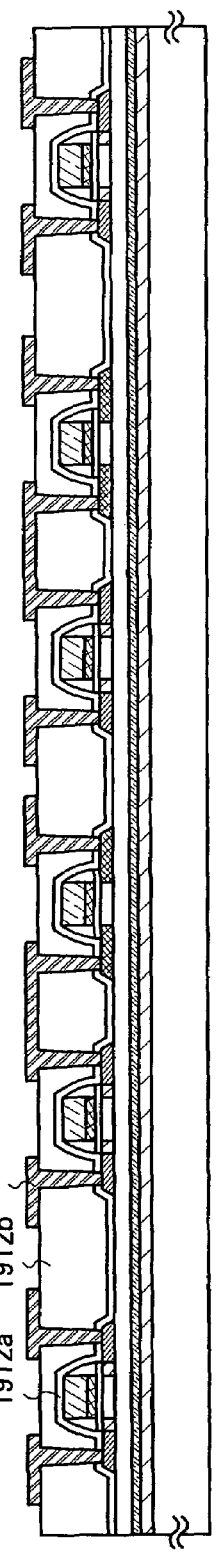
FIGS. 10A to 10C are cross-sectional views of a semiconductor device in the present invention.

As shown in FIG. 10A, a single-layer structure or a stacked-layer structure of an insulating film is formed so as to cover the semiconductor films 1905a to 1905f and the gate electrodes 1907, and conductive films 1913 which are electrically connected to the impurity regions 1909 and 1911 which form source regions or drain regions of the thin film transistors 1900a to 1900f are formed over the insulating film. The single-layer structure or the stacked-layer structure of the insulating film is formed using an inorganic material such as silicon oxide or silicon nitride, an organic material such as polyimide, polyamide, benzocyclobutene, acryl, or epoxy, a siloxane material, or the like by CVD, sputtering, SOG, droplet discharging, screen printing, or the like. Here, the insulating film is formed to have a two-layer structure, and a silicon nitride oxide film is formed as a first-layer insulating film 1912a and a silicon oxynitride film is formed as a second-layer insulating film 1912b. In addition, the conductive films 1913 form source electrodes or drain electrodes of the semiconductor films 1905a to 1905f.

Note that thermal treatment aimed at recovery of crystallinity of the semiconductor films, activation of the impurity element which has been introduced into the semiconductor films, or hydrogenation of the semiconductor films may be performed before the insulating films 1912a and 1912b are formed or after one or a plurality of thin films of the insulating films 1912a and 1912b are formed. Thermal anneal, laser anneal, RTA, or the like may be applied to thermal treatment.

The conductive films 1913 are formed of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), or silicon (Si), or an alloy material or a compound material which includes any of these elements as a main component, and has a single-layer structure or a stacked-layer structure. For example, an alloy material which includes aluminum as a main component corresponds to a material which includes aluminum as a main component and includes nickel, or an alloy material which includes aluminum as a main component and includes nickel and one or both of carbon and silicon. As the conductive films 1913, for example, a stacked-layer structure of a barrier film, an aluminum silicon (Al—Si) film, and a barrier film or a stacked-layer structure of a barrier film, an aluminum silicon (Al—Si) film, a titanium nitride film, and a barrier film may be employed. Note that the barrier film corresponds to a thin film formed of titanium, titanium nitride, molybdenum, or molybdenum nitride. Since aluminum and aluminum silicon have low resistance values and are inexpensive, they are suitable for a material for forming the conductive films 1913. In addition, by providing the barrier films in an upper layer and a lower layer, generation of a hillock of aluminum or aluminum silicon can be prevented. Further, by forming a barrier film with titanium which is an element having a high reducing property, even when a thin natural oxide film is formed over the crystalline semiconductor films, the natural oxide film can be reduced and an excellent contact with the crystalline semiconductor films can be obtained.

Next, an insulating film 1914 is formed so as to cover the conductive films 1913, and conductive films 1915a and 1915b, which are electrically connected to the conductive films 1913 which form source electrodes or drain electrodes of the semiconductor films 1905a and 1905f, are formed over the insulating film 1914. In addition, conductive films 1916a and 1916b, which are electrically connected to the conductive films 1913 which form the source electrodes or the drain electrodes of the semiconductor films 1905b and 1905e, are formed. Note that the conductive films 1915a and 1915b and the conductive films 1916a and 1916b may be formed by using the same material and at the same time. The conductive films 1915a and 1915b and the conductive films 1916a and 1916b can be formed by using any of materials described for the conductive films 1913.

Figure 10B:
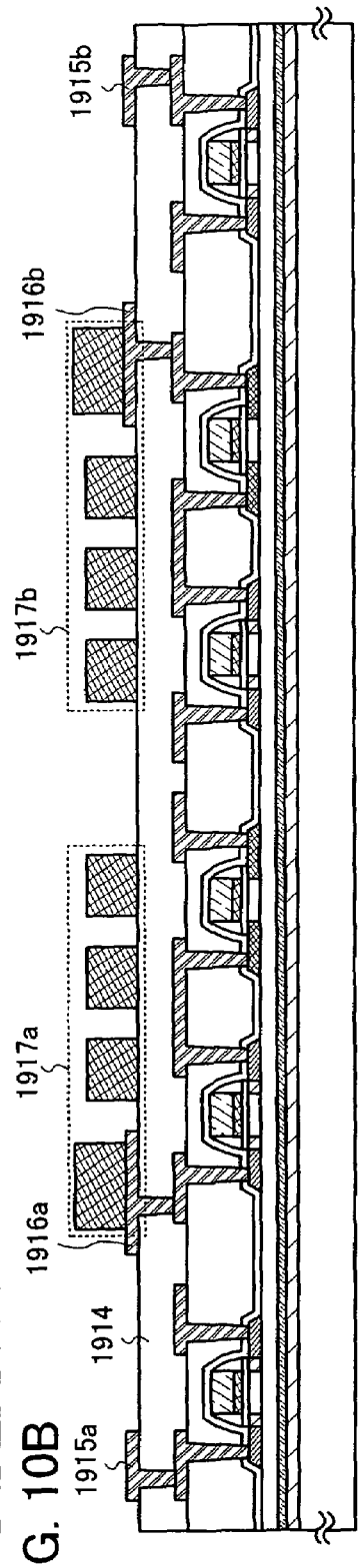

Next, as shown in FIG. 10B, conductive films 1917a and 1917b functioning as antennas are formed so as to be electrically connected to the conductive films 1916a and 1916b.

The insulating film 1914 can be provided to have a single-layer structure or a stacked-layer structure formed of an insulating film including oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film including carbon such as DLC (diamond like carbon), an organic material such as epoxy, polyimide, polyamide, polyvinyl phenol, benzocyclobutene, or acryl, or a siloxane material such as a siloxane resin. Note that the siloxane material corresponds to a material including a Si—O—Si bond. Siloxane has a skeletal structure with the bond of silicon (Si) and oxygen (O). As a substituent, an organic group including at least hydrogen (e.g., an alkyl group or aromatic hydrocarbon) is used. As the substituent, a fluoro group can also be used. Alternatively, as the substituent, the organic group including at least hydrogen and the fluoro group may be used.

The conductive films 1917a and 1917b are formed of a conductive material by CVD, sputtering, printing such as screen printing or gravure printing, droplet discharging, dispensing, metal plating, or the like. The conductive material is formed of an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material which includes any of these elements as a main component, and has a single-layer structure or a stacked-layer structure.

For example, in the case of forming the conductive films 1917a and 1917b which function as the antennas by screen printing, the conductive films 1917a and 1917b can be provided by selectively printing a conductive paste where a conductive particle having a particle size of several nm to several ten μm is dissolved or dispersed in an organic resin. As the conductive particle, metal particles of one or more of silver (Ag), gold (Au), copper (Cu), nickel (Ni), platinum (Pt), palladium (Pd), tantalum (Ta), molybdenum (Mo), titanium (Ti), and the like, a fine particle of silver halide, or a dispersing nano particle can be used. In addition, as the organic resin included in the conductive paste, one or more selected from organic resins functioning as a binder, a solvent, a dispersive agent, and a coating member of the metal particles can be used. Typically, an organic resin such as an epoxy resin or a silicone resin can be given as an example of the organic resin included in the conductive paste. Further, in forming the conductive film, baking is preferably performed after the conductive paste is pushed out. For example, in the case of using a fine particle which includes silver as a main component (for example, a particle size is equal to or greater than 1 nm and equal to or less than 100 nm) as a material for the conductive paste, the conductive film can be obtained by baking it with temperatures in the range of 150 to 300° C. to cure. Further, a fine particle which includes solder or lead-free solder as a main component may also be used. In this case, it is preferable that a fine particle having a particle size of 20 μm or less be used. Solder or lead-free solder has an advantage such as low cost.

Figure 10C:
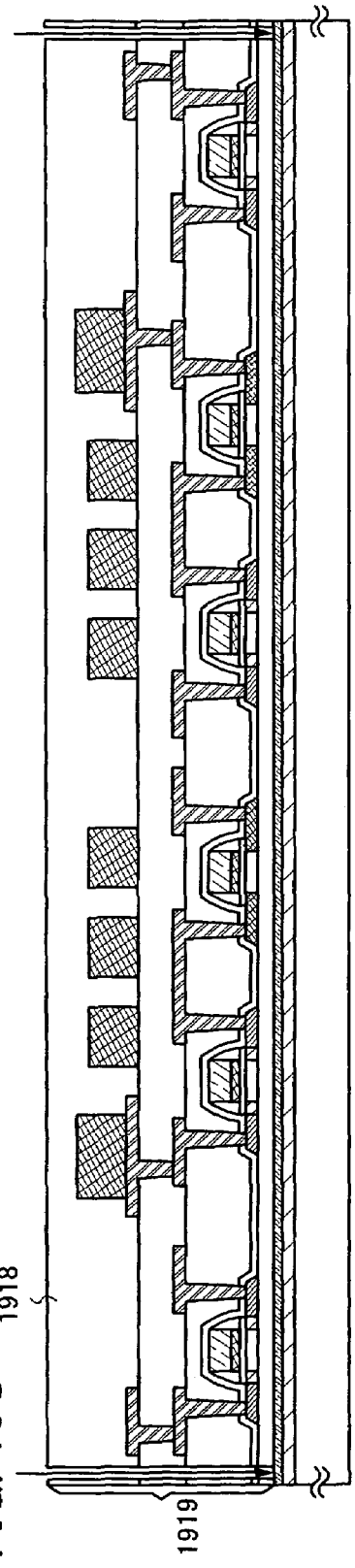

Next, as shown in FIG. 10C, after forming an insulating film 1918 so as to cover the conductive films 1917a and 1917b, a layer which includes the thin film transistors 1900a to 1900f, the conductive films 1917a and 1917b, and the like (hereinafter described as an element formation layer 1919) is peeled off the substrate 1901. Here, the element formation layer 1919 can be peeled off the substrate 1901 by using physical force after an opening portion is formed in a region excluding the thin film transistors 1900a to 1900f by laser beam irradiation (e.g., UV light). Alternatively, before peeling the element formation layer 1919 off the substrate 1901, the release layer 1903 may be selectively removed by introducing an etching agent into the opening portion formed. Gas or liquid including halogen fluoride or a halogen compound is used as the etching agent. For example, chlorine trifluoride ($ClF_3$) is used as the gas including halogen fluoride. Then, the element formation layer 1919 is peeled off the substrate 1901.

Note that the release layer 1903 may be partially left without being removed entirely. Therefore, consumption of the etching agent can be suppressed and a processing time which is necessary for removing the release layer can be shortened. In addition, the element formation layer 1919 can be held over the substrate 1901 even after the release layer 1903 is peeled off the substrate 1901. Further, by recycling the substrate 1901 from which the element formation layer 1919 is peeled, cost can be reduced.

The insulating film 1918 can be provided to have a single-layer structure or a stacked-layer structure formed of an insulating film including oxygen or nitrogen such as silicon oxide ($SiO_x$), silicon nitride ($SiN_x$), silicon oxynitride ($SiO_xN_y$) (x>y), or silicon nitride oxide ($SiN_xO_y$) (x>y), a film including carbon such as DLC (Diamond Like Carbon), an organic material such as epoxy, polyimide, polyamide, polyvinyl phenol, benzocyclobutene, or acryl, or a siloxane material such as a siloxane resin.

Figure 11A:
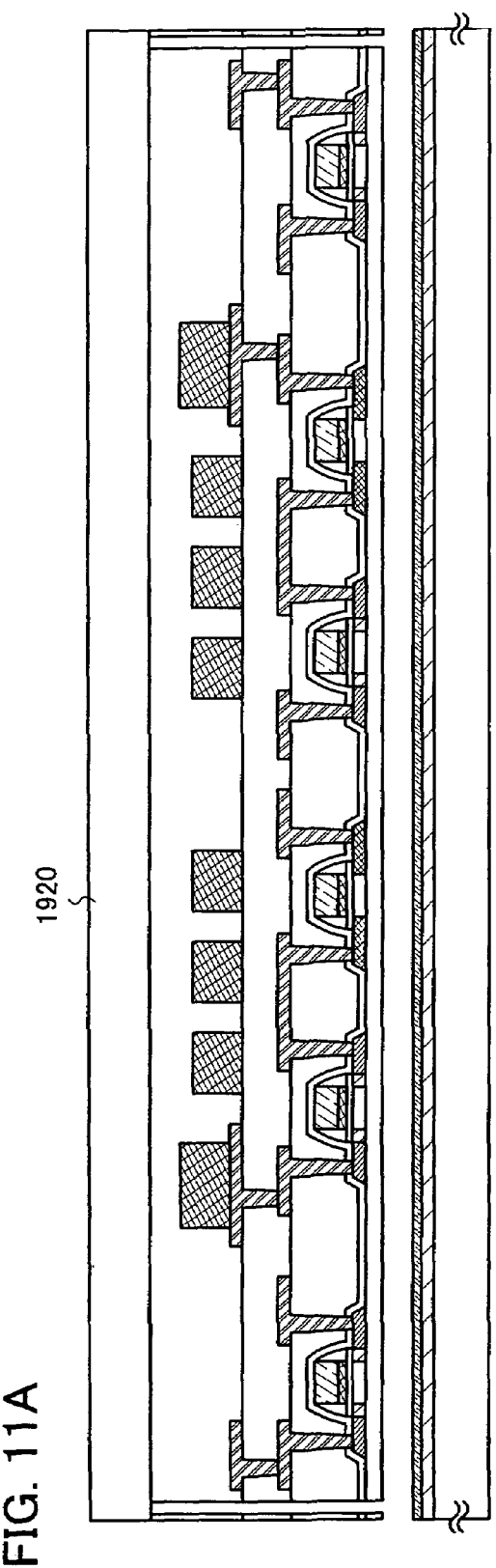
FIGS. 11A and 11B are cross-sectional views of a semiconductor device in the present invention.

In this embodiment, as shown in FIG. 11A, after forming an opening portion in the element formation layer 1919 by laser light irradiation, a first sheet material 1920 is attached to one surface of the element formation layer 1919 (a surface in which the insulating film 1918 is exposed), and then, the element formation layer 1919 is peeled off the substrate 1901.

Figure 11B:
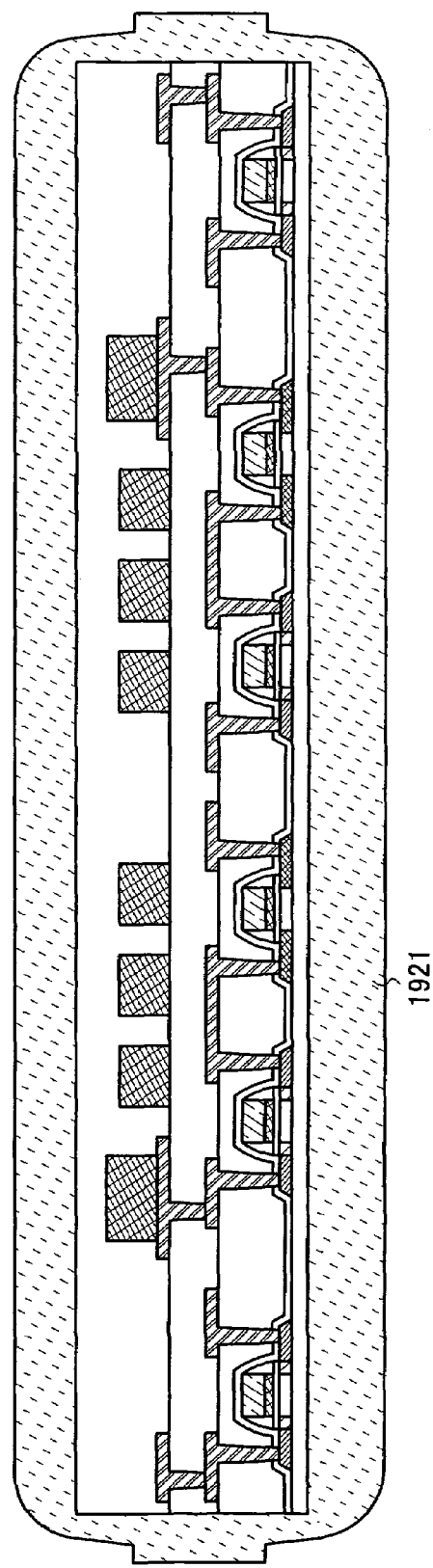

Next, as shown in FIG. 11B, after the second sheet material 1921 is transposed to the other surface of the element formation layer 1919 (a surface which is exposed by the peeling), the second sheet material 1921 is attached by performing one or both of thermal treatment and pressure treatment. As the first sheet material 1920 and the second sheet material 1921, a hot melt film or the like can be used.

As the first sheet material 1920 and the second sheet material 1921, a film to which countermeasures against static electricity is applied in order to prevent static electricity or the like (hereinafter described as an anitistatic film) can also be used. A film in which an antistatic material is dispersed in a resin, a film to which an antistatic material is attached, and the like can be given as examples of the antistatic film. As a film in which an antistatic material is provided, a film in which an antistatic material is provided on one surface may be employed, or a film in which an antistatic material is provided on both surfaces may be employed. In addition, the film in which the antistatic material is provided on one surface, a surface in which the antistatic material is provided may be attached to the element formation layer 1919 so as to be inside of the film, or may be attached to the layer so as to be outside of the film. Note that the antistatic material may be provided on the entire surface or a part of the surface. Here, as the antistatic material, metal, indium tin oxide (ITO), and a surface active agent such as an ampholytic surface active agent, a cationic surface active agent, or a nonionic surface active agent can be used. Alternatively, as the antistatic material, a resin material including a cross-linking polymer which has a carboxyl group and quaternary ammonium base as a side chain or the like can also be used. By attaching these materials to the film, kneading these materials into the film, or applying these materials to the film, the antistatic film can be completed. By sealing the element formation layer 1919 with the antistatic film, the case where a semiconductor element is adversely affected by static electricity or the like from outside can be prevented when the semiconductor device is handled as a product.

Although this embodiment illustrates an example in which the element formation layer 1919 is separated from the substrate 1901, the above-described element formation layer 1919 can be formed over the substrate 1901 without forming the release layer 1903 to be used as the semiconductor device.

Note that if an SOI (silicon on insulator) substrate is used as the substrate 1901, a single-crystalline semiconductor film can be used as a semiconductor film so that the number of steps can be reduced by a step of crystallization of the semiconductor film.

Note that this embodiment can be combined with the technical components of other embodiments in this specification. In other words, by employing the semiconductor device in this embodiment, a wireless system, a semiconductor device, and a communication device with high reliability can be provided in which even if part of functional circuits in the semiconductor device cannot give a normal processing result due to mechanical or electrical breakdown, a processing result can be obtained from other functional circuits. In addition, a wireless system and a communication device with high reliability can be provided in which even if one semiconductor device cannot give a normal processing result due to mechanical or electrical breakdown, a normal result can be obtained from other semiconductor devices.

Embodiment 4

In this embodiment, an example is shown in which the semiconductor device of the present invention is manufactured using transistors formed on a single crystalline substrate. Since variations in characteristics of the transistors formed on the single crystalline substrate can be suppressed, the number of transistors used for the semiconductor device can be suppressed.

First, as shown in FIG. 12A, an element isolation insulating film 2301, for electrical isolation of semiconductor elements, is formed using an insulating film over a semiconductor substrate 2300. By forming the element isolation insulating film 2301, a region (element formation region 2302) where a transistor is to be formed and an element formation region 2303 can be electrically isolated.

As the semiconductor substrate 2300, for example, a single crystalline silicon substrate having n-type or p-type conductivity, a compound semiconductor substrate (e.g., a GaAs substrate, an InP substrate, a GaN substrate, a SiC substrate, a sapphire substrate, or a ZnSe substrate), an SOI (silicon on insulator) substrate manufactured by using a bonding method or a SIMOX (separation by implanted oxygen) method, or the like can be used.

In order to form the element isolation insulating film 2301, a selective oxidation method (a LOCOS (local oxidation of silicon) method), a trench isolation method, or the like can be used.

In addition, in this embodiment, an example is shown in which a single crystalline silicon substrate having n-type conductivity is used as the semiconductor substrate 2300, and a p-well 2304 is formed in the element formation region 2303. The p-well 2304, formed in the element formation region 2303 of the semiconductor substrate 2300, can be formed by selectively introducing an impurity element imparting p-type conductivity to the element formation region 2303. For the impurity element imparting p-type conductivity, boron (B), aluminum (Al), gallium (Ga), or the like can be used. In addition, in the case where a semiconductor substrate having p-type conductivity is used as the semiconductor substrate 2300, an impurity element imparting n-type conductivity is selectively introduced to the element formation region 2302 to form an n-well.

Note that in this embodiment, since a semiconductor substrate having n-type conductivity is used as the semiconductor substrate 2300, an impurity element is not introduced to the element formation region 2302. However, by introducing an impurity element imparting n-type conductivity, an n-well can be formed in the element formation region 2302. As the impurity element imparting n-type conductivity, phosphorus (P), arsenic (As), or the like can be used.

Next, as shown in FIG. 12B, insulating films 2305 and 2306 are formed so as to cover the element formation regions 2302 and 2303, respectively. In this embodiment, silicon oxide films, which are formed in the element formation regions 2302 and 2303 by thermally oxidizing the semiconductor substrate 2300, are used as the insulating films 2305 and 2306, respectively. In addition, after silicon oxide films are formed by thermal oxidation, silicon oxynitride films may be formed by nitriding the surface of the silicon oxide films by performing nitridation treatment so that a stacked layer of the silicon oxide film and the silicon oxynitride film can be used as the insulating films 2305 and 2306.

In addition, as described above, the insulating films 2305 and 2306 can be formed by plasma treatment. For example, the surface of the semiconductor substrate 2300 is oxidized or nitrided by high-density plasma treatment, whereby silicon oxide ($SiO_x$) films or silicon nitride ($SiN_x$) films can be formed as the insulating films 2305 and 2306 in the element formation regions 2302 and 2303.

Next, as shown in FIG. 12C, a conductive film is formed so as to cover the insulating films 2305 and 2306. In this embodiment, an example in which conductive films 2307 and 2308 are sequentially stacked as the conductive film is shown. For the conductive film, a single-layer structure of a conductive film or a stacked-layer structure having three or more layers of conductive films can be employed.

As the conductive films 2307 and 2308, tantalum (Ta), tungsten (W), titanium (Ti), molybdenum (Mo), aluminum (Al), copper (Cu), chromium (Cr), niobium (Nb), or the like can be used. In addition to a film formed of an aforementioned metal, a film formed of an alloy containing an aforementioned metal as its main component, or a compound containing an aforementioned metal can be used for the conductive films 2307 and 2308. Alternatively, the conductive films 2307 and 2308 can be formed using a semiconductor such as polycrystalline silicon doped with an impurity element such as phosphorus imparting conductivity to a semiconductor film. In this embodiment, the conductive film 2307 is formed of tantalum nitride, and the conductive film 2308 is formed of tungsten.

Next, as shown in FIG. 13A, by processing (patterning) the stacked layer of the conductive films 2307 and 2308 into a predetermined form, gate electrodes 2309 and 2310 are formed over the insulating films 2305 and 2306, respectively.

Next, as shown in FIG. 13B, a mask 2311 is selectively formed using a resist so as to cover the element formation region 2302. Then, an impurity element is introduced to the element formation region 2303. Since the gate electrode 2310 also functions as a mask in addition to the mask 2311, by introducing the above-described impurity element, an impurity region 2312 which function as a source region or a drain region, and a channel formation region 2313 are formed in the p-well 2304. As the impurity element, an impurity element imparting n-type or p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, phosphorus (P) is used as the impurity element.

As shown in FIG. 13C, after the mask 2311 is removed, a mask 2314 is selectively formed using a resist so as to cover the element formation region 2303. Then, an impurity element is introduced to the element formation region 2302. Since the gate electrode 2309 also functions as a mask in addition to the mask 2314, an impurity region 2315 which functions as a source region or a drain region, and a channel formation region 2316 are formed in the semiconductor substrate 2300 within the element formation region 2302. As the impurity element, an impurity element imparting n-type or p-type conductivity is used. As the impurity element imparting n-type conductivity, phosphorus (P), arsenic (As), or the like can be used. As the impurity element imparting p-type conductivity, boron (B), aluminum (Al), gallium (Ga), or the like can be used. In this embodiment, an impurity element (e.g., boron (B)) imparting a different conductivity type from that of the impurity element introduced to the element formation region 2302 in FIG. 12C is introduced.

Figure 14A:
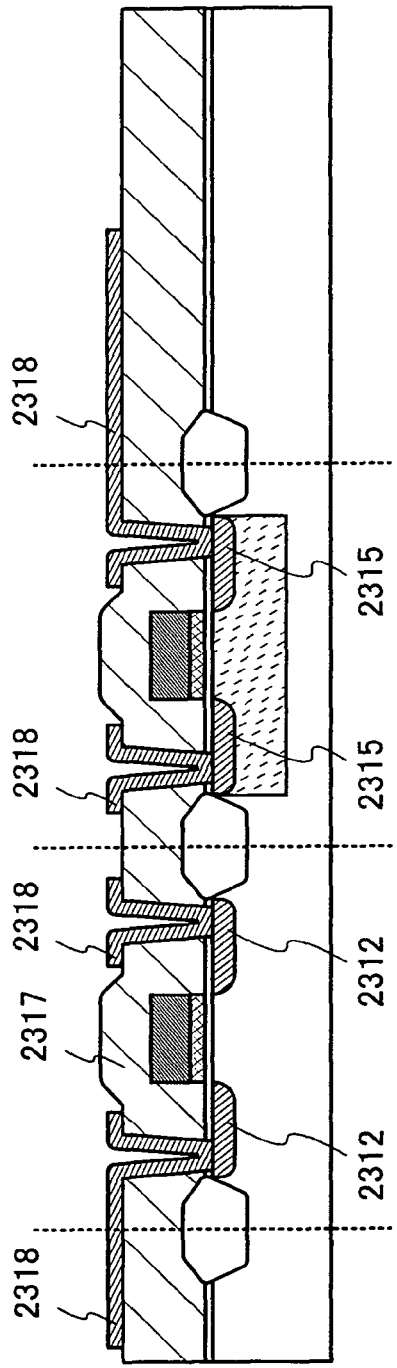
FIGS. 14A and 14B are cross-sectional views of a semiconductor device in the present invention.

Next, as shown in FIG. 14A, an insulating film 2317 is formed so as to cover the insulating films 2305 and 2306, and the gate electrodes 2309 and 2310. Then, contact holes are formed in the insulating film 2317 to expose part of the impurity regions 2312 and 2315. Following this, conductive films 2318, which are connected to the impurity regions 2312 and 2315 through the contact holes, are formed. The conductive films 2318 can be formed by CVD, sputtering, or the like.

The insulating film 2317 can be formed by using an inorganic insulating film, an organic resin film, or a siloxane-based insulating film. For the inorganic insulating film, silicon oxide, silicon oxynitride, silicon nitride oxide, a film containing carbon typified by DLC (diamond like carbon), or the like can be used. For the organic resin film, for example, acrylic, epoxy, polyimide, polyamide, polyvinyl phenol, benzocyclobutene, or the like can be used. Moreover, the insulating film 2317 can be formed by CVD, sputtering, droplet discharging, printing, or the like depending on its material.

Note that a transistor used for the semiconductor device in the present invention is not limited to the structure shown in this embodiment. For example, an inversely-staggered structure can be employed.

Figure 14B:
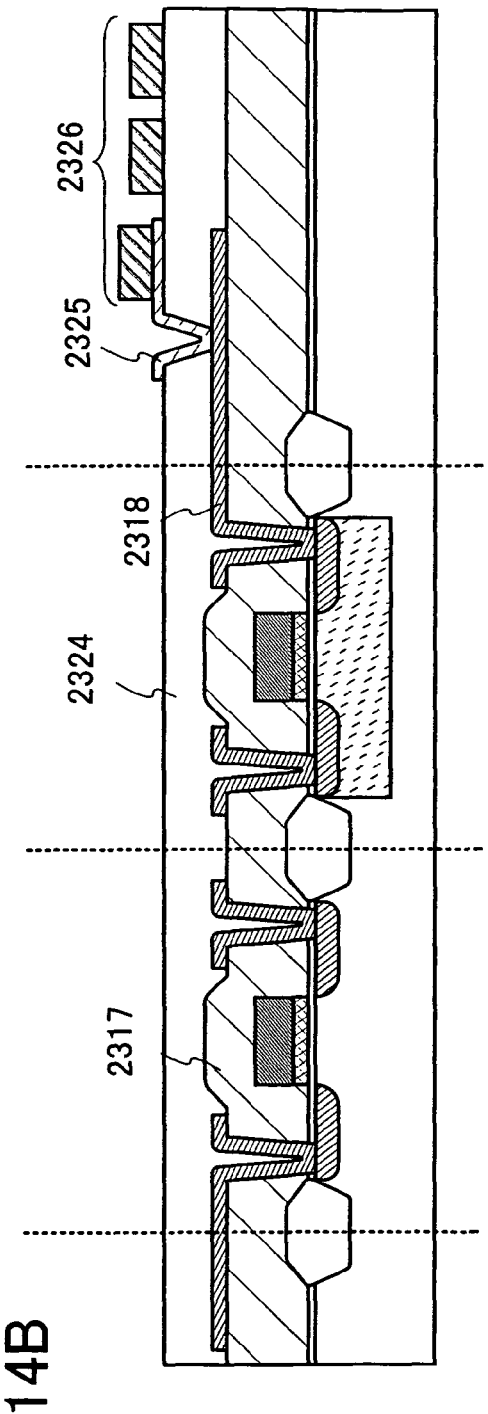

Next, as shown in FIG. 14B, an interlayer film 2324 is formed. Then, the interlayer film 2324 is etched and a contact hole is formed in order to expose part of the conductive film 2318. Although the interlayer film 2324 is not limited to a resin and other films such as a CVD oxide film can be used, a resin is preferable in terms of flatness. In addition, a contact hole can be formed by using a photosensitive resin without etching. Next, a wiring 2325 which is in contact with the conductive film 2318 through the contact hole is formed over the interlayer film 2324.

Next, a conductive film 2326 which functions as an antenna is formed so as to be in contact with the wiring 2325. The conductive film 2326 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), zinc (Zn), tin (Sn), or nickel (Ni). In addition to a film formed of an aforementioned metal, a film formed of an alloy containing an aforementioned metal as its main components, or a compound containing an aforementioned metal can be used for the conductive film 2326. A single-layer structure of the aforementioned film or a stacked-layer structure of a plurality of the aforementioned films can be used for the conductive film 2326.

The conductive film 2326 can be formed by CVD, sputtering, printing such as screen printing or gravure printing, droplet discharging, dispensing, plating, photolithography, evaporation, or the like.

Although an example in which the antenna and the semiconductor element are formed over the same substrate is shown in this embodiment, the present invention is not limited thereto. After the semiconductor element is formed, an antenna which is formed separately can be electrically connected to an integrated circuit. In that case, the antenna and the integrated circuit can be electrically connected by pressure bonding using an anisotropic conductive film (ACF), anisotropic conductive paste (ACP), or the like. Alternatively, a conductive adhesive such as a silver paste, a copper paste, or a carbon paste; soldering; or the like can be used for connection.

Note that this embodiment can be combined with the technical components of other embodiments in this specification. In other words, by employing the semiconductor device in this embodiment, a wireless system, a semiconductor device, and a communication device with high reliability can be provided in which even if part of functional circuits in the semiconductor device cannot give a normal processing result due to mechanical or electrical breakdown, a processing result can be obtained from other functional circuits. In addition, a wireless system and a communication device with high reliability can be provided in which even if one semiconductor device cannot give a normal processing result due to mechanical or electrical breakdown, a normal result can be obtained from other semiconductor devices.

Embodiment 5

In this embodiment, the use of the semiconductor device of the present invention will be described. For example, the semiconductor device of the present invention can be used for an electronic appliance such as portable telephones, digital video cameras, computers, portable information terminals (such as mobile computers, portable game machines, or electronic books), image reproduction devices including recording media (specifically, digital versatile discs, or 'DVD'). Further, the semiconductor device of the present invention can be used as a so-called IC label or an IC card that is provided to bills, coins, securities, bearer bonds, documents (e.g., driver's licenses or resident's cards), packaging containers (e.g., wrapping paper or bottles), recording media (e.g., DVD software or video tapes), vehicles (e.g., bicycles), personal belongings (e.g., bags or glasses), foods, plants, animals, human bodies, clothing, everyday articles, or tags on commercial products such as electronic appliances or on bags.

Note that, in this embodiment, an IC card is a card which is formed by embedding a thin semiconductor device (an IC chip) in a plastic card so as to store information. In addition, since an aspect of the semiconductor device of the present invention may vary, any semiconductor device having a label shape is called an IC label.

This embodiment will describe an example of the practical use of an IC label and an IC card provided with the semiconductor device of the present invention, and an example of goods attached with them with reference to FIGS. 15A to 15E.

FIG. 15A illustrates an example of an IC label including the semiconductor device of the present invention. A plurality of IC labels 3003 including semiconductor devices 3002 are formed over label boards 3001 (separate paper). The IC labels 3003 are stored in a box 3004. In addition, on the IC labels 3003, information on a commercial product or service (e.g., a name of the product, a brand, a trademark, a trademark owner, a seller, or a manufacturer) is written while an ID number which is specific to the commercial product (or the kind of the commercial product) is assigned to the incorporated semiconductor device, so that forgery, infringement of intellectual property rights such as a patent and a trademark, and illegality such as unfair competition can be easily figured out. Further, a lot of information which is too much to be written clearly on a container or a label of the commercial product, for example, production area, selling area, quality, raw material, efficacy, use, quantity, shape, price, production method, directions for use, production time, time of the use, expiration date, instructions of the commercial product, information on the intellectual property of the commercial product, and the like can be input to the semiconductor device; thus, a trader and a consumer can access the information by using a reader. The producer can also easily rewrite or delete the information while the trader and the consumer are not allowed to rewrite or delete the information.

FIG. 15B illustrates a label-shaped IC label 3011 including the semiconductor device of the present invention. By providing the IC label 3011 to a commercial product, merchandise management becomes easy. For example, in the case where the commercial product is stolen, the thief can be quickly recognized by following the pathway of the commercial product stolen. In this manner, by using the IC label, products which are superior in so-called traceability can be distributed.

FIG. 15C illustrates an example of a state of a completed product of an IC card 3021 including the semiconductor device of the present invention. The IC card 3021 includes all kinds of cards such as a cash card, a credit card, a prepaid card, an electronic train ticket, electronic money, a telephone card, and a membership card.

The IC card including the semiconductor device of the present invention, shown in FIG. 15C, can be used even if it is bent in a distorted shape as shown in FIG. 15D. Since the present invention employs the structure in which a semiconductor device includes a plurality of functional circuits as described in the aforementioned embodiments, the present invention is useful particularly in an environment where the semiconductor device easily breaks down.

FIG. 15E shows a state of a completed product of a bearer bond 3031. The semiconductor device of the present invention is embedded in the bearer bond 3031 and is protected by a resin formed on the periphery thereof. Here, the resin is filled with a filler. The bearer bond 3031 can be made in the same way as the IC label and the IC card of the present invention are made. Note that the aforementioned bearer bond includes stamps, tickets, admission tickets, merchandise coupons, book coupons, stationery coupons, beer coupons, rice coupons, various gift coupons, various service coupons, and the like. It is needless to say that the invention is not limited thereto. In addition, when the semiconductor device 3032 of the invention is provided for bills, coins, securities, bearer bonds, documents, or the like, an authentication function can be provided; thus, forgery can be prevented by use of the authentication function.

In this manner, an IC label and an IC card including the semiconductor device of the present invention can be provided for any goods (including creatures).

This embodiment can be combined with the technical components of other embodiments in this specification. In other words, by employing the semiconductor device in this embodiment, a wireless system, a semiconductor device, and a communication device with high reliability can be provided in which even if part of functional circuits in the semiconductor device cannot give a normal processing result due to mechanical or electrical breakdown, a processing result can be obtained from other functional circuits. In addition, a wireless system and a communication device with high reliability can be provided in which even if one semiconductor device cannot give a normal processing result due to mechanical or electrical breakdown, a normal processing result can be obtained from other semiconductor devices.

The present application is based on Japanese Priority Patent Application No. 2007-024143 filed on Feb. 2, 2007 with the Japan Patent Office, the entire contents of which are hereby incorporated by reference.

What is claimed is:

1. A wireless system comprising:
a semiconductor device comprising a plurality of functional circuits and configured to transmit signals processed by the plurality of functional circuits with subcarriers; and
a communication device comprising an arithmetic processing circuit and configured to receive the signals,
wherein each of the subcarriers is associated with a corresponding functional circuit and has a different frequency, and
wherein the arithmetic processing circuit in the communication device performs a majority decision process on the signals.

2. The wireless system according to claim 1, wherein the communication device comprises a computation processor.

3. The wireless system according to claim 1, wherein the arithmetic processing circuit is connected to a server separated from the communication device.

4. The wireless system according to claim 1, wherein the semiconductor device is included in an IC label or an IC card.

5. The wireless system according to claim 1,
wherein the semiconductor device comprises a transmission/reception circuit, and
wherein the transmission/reception circuit comprises a modulation circuit configured to transmit the subcarriers each having different frequencies.

6. A wireless system comprising:
a plurality of semiconductor devices each comprising a functional circuit and configured to transmit a signal processed by the functional circuit with a subcarrier; and
a communication device comprising an arithmetic processing circuit and configured to receive the signals,
wherein each subcarrier is associated with a corresponding functional circuit in each of the plurality of semiconductor devices and has a different frequency, and
wherein the arithmetic processing circuit in the communication device performs a majority decision process on the signals.

7. The wireless system according to claim 6, wherein the communication device comprises a computation processor.

8. The wireless system according to claim 6, wherein the arithmetic processing circuit is connected to a server separated from the communication device.

9. The wireless system according to claim 6, wherein the plurality of semiconductor devices are included in an IC label or an IC card.

10. The wireless system according to claims 6,
wherein each of the plurality of semiconductor devices comprises a transmission/reception circuit, and
wherein the transmission/reception circuit comprises a modulation circuit configured to transmit the subcarriers each having different frequencies.

11. A wireless system comprising:
a semiconductor device comprising a plurality of functional circuits and a first transmission/reception circuit comprising a modulation circuit; and
a communication device comprising an arithmetic processing circuit and a second transmission/reception circuit,
wherein a signal comprising processing results of the plurality of functional circuits is transmitted from the first transmission/reception circuit to the second transmission/reception circuit with a plurality of subcarriers transmitted from the modulation circuit, each of the plurality of subcarriers having different frequencies for each of the processing results, and
wherein the arithmetic processing circuit performs a majority decision process on the signal transmitted from the first transmission/reception circuit.

12. The wireless system according to claim 11, wherein the communication device comprises a computation processor.

13. The wireless system according to claim 11, wherein the arithmetic processing circuit is connected to a server separated from the communication device.

14. The wireless system according to claim 11, wherein the semiconductor device is included in an IC label or an IC card.

15. A semiconductor device comprising:
a plurality of functional circuits;
a controller configured to read data stored in each of the plurality of functional circuits; and
a transmission/reception circuit,
wherein the transmission/reception circuit is configured to transmit the data as a first signal to a communication device,
wherein the first signal includes subcarriers superimposed thereon,
wherein each of the subcarriers is associated with a corresponding functional circuit and has a different frequency, and
wherein the transmission/reception circuit is configured to receive a second signal according to majority decision processed data which is obtained by a majority decision process based on the first signal in an arithmetic processing circuit included in the communication device.

16. The semiconductor device according to claim 15, wherein the communication device comprises a computation processor configured to output the second signal according to the majority decision processed data.

17. The semiconductor device according to claim 15,
wherein the arithmetic processing circuit is connected to a server separated from the communication device, and
wherein the arithmetic processing circuit outputs the second signal according to the majority decision processed data.

18. An IC label or an IC card comprising the semiconductor device according to claims 15.

19. The semiconductor device according to claim 15,
wherein the transmission/reception circuit comprises a modulation circuit configured to transmit the subcarriers each having different frequencies.

20. A communication device comprising:
a transmission/reception circuit configured to receive a first signal from a semiconductor device comprising a plurality of functional circuits, and configured to transmit a second signal to the semiconductor device; and
an arithmetic processing circuit configured to perform a majority decision process on the first signal received at the transmission/reception circuit, and configured to output majority decision processed data,
wherein the first signal includes subcarriers superimposed thereon, and
wherein each of the subcarriers is associated with a corresponding functional circuit and has a different frequency.

21. The communication device according to claim 20, further comprising a computation processor configured to output the second signal according to the majority decision processed data.

22. The communication device according to claim 20, wherein the arithmetic processing circuit is separated from the communication device, and is connected to a server configured to output the second signal according to the majority decision processed data.

23. The communication device according to claim 20, wherein the semiconductor device is included in an IC label or an IC card.

24. A communication device comprising:
- a transmission/reception circuit configured to receive a first signal from a plurality of semiconductor devices each comprising a functional circuit, and configured to transmit a second signal to the plurality of semiconductor devices; and
- an arithmetic processing circuit configured to perform a majority decision process on the first signal received at the transmission/reception circuit, and configured to output majority decision processed data,
- wherein the first signal includes subcarriers superimposed thereon, and
- wherein each subcarrier is associated with a corresponding functional circuit in each of the plurality of semiconductor devices and has a different frequency.

25. The communication device according to claim 24, further comprising a computation processor configured to output the second signal according to the majority decision processed data.

26. The communication device according to claim 24, wherein the arithmetic processing circuit is separated from the communication device, and is connected to a server configured to output the second signal according to the majority decision processed data.

27. The communication device according to claim 24, wherein the plurality of semiconductor devices are included in an IC label or an IC card.

* * * * *

UNITED STATES PATENT AND TRADEMARK OFFICE
CERTIFICATE OF CORRECTION

PATENT NO. : 8,058,997 B2  
APPLICATION NO. : 12/010790  
DATED : November 15, 2011  
INVENTOR(S) : Yoshiyuki Kurokawa Page 1 of 1

It is certified that error appears in the above-identified patent and that said Letters Patent is hereby corrected as shown below:

At column 8, line 41, "nominal" should be --normal--;

At column 18, line 57, "foamed" should be --formed--;

At column 29, line 54, "claims 6" should be --claim 6--;

At column 30, line 45, "claims 15" should be --claim 15--.

Signed and Sealed this  
Tenth Day of January, 2012

David J. Kappos  
*Director of the United States Patent and Trademark Office*